US012475834B2

(12) United States Patent
Hwang et al.

(10) Patent No.: US 12,475,834 B2
(45) Date of Patent: Nov. 18, 2025

(54) LIGHT EMITTING DIODE (LED) DISPLAY DEVICE ACCURATELY SENSING EXPONENTIAL CURRENT IN PIXEL SENSING CIRCUIT

(71) Applicant: SAMSUNG DISPLAY CO., LTD., Yongin-si (KR)

(72) Inventors: Young Soo Hwang, Yongin-si (KR); Sung-Chan Jo, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/135,653

(22) Filed: Apr. 17, 2023

(65) Prior Publication Data

US 2024/0029632 A1 Jan. 25, 2024

(30) Foreign Application Priority Data

Jul. 25, 2022 (KR) ........................ 10-2022-0092021

(51) Int. Cl.
*G09G 3/32* (2016.01)

(52) U.S. Cl.
CPC ....... *G09G 3/32* (2013.01); *G09G 2300/0833* (2013.01); *G09G 2300/0842* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS 8,098,742 B2 1/2012 Kazakevick et al.
8,707,546 B2 4/2014 Singh et al.
9,972,246 B2 5/2018 Park et al.
12,175,923 B2 * 12/2024 Hwang ................ G09G 3/3233
2011/0074750 A1 * 3/2011 Leon ........................ G09G 3/30 345/207
2013/0050292 A1 * 2/2013 Mizukoshi ........... G09G 3/3233 345/77
2015/0243217 A1 * 8/2015 Park ..................... G09G 3/3258 345/76
2016/0104422 A1 * 4/2016 Kishi ..................... G09G 3/006 345/205
2016/0163255 A1 * 6/2016 Kim ..................... G09G 3/3291 345/212

(Continued)

FOREIGN PATENT DOCUMENTS

KR 1020200081081 A 7/2020
KR 10215331 B1 9/2020
KR 102153131 B1 9/2020

*Primary Examiner* — Ke Xiao
*Assistant Examiner* — Nelson Lam
(74) *Attorney, Agent, or Firm* — CANTOR COLBURN LLP

(57) ABSTRACT

A display device includes: a pixel including a light emitting element; and a sensing channel connected to a first electrode of the light emitting element by a first sensing line, and connected to a second electrode of the light emitting element by a second sensing line. The sensing channel includes: an amplifier including a first input terminal connected to the second sensing line; and a first switch which connects an output terminal of the amplifier to the first sensing line.

17 Claims, 18 Drawing Sheets

(56) References Cited

U.S. PATENT DOCUMENTS

| | | | | |
|---|---|---|---|---|
| 2017/0249882 | A1* | 8/2017 | Lee | G09G 3/3241 |
| 2020/0193905 | A1* | 6/2020 | Yoon | G09G 3/3233 |
| 2021/0201787 | A1* | 7/2021 | Yuan | H10K 59/121 |
| 2022/0139332 | A1* | 5/2022 | Park | G09G 3/3283<br>345/214 |
| 2022/0270528 | A1* | 8/2022 | Ha | G09G 3/006 |

* cited by examiner

<THRESHOLD VOLTAGE SENSING PERIOD>

<MOBILITY SENSING PERIOD>

<MOBILITY SENSING PERIOD>

LIGHT EMITTING DIODE (LED) DISPLAY DEVICE ACCURATELY SENSING EXPONENTIAL CURRENT IN PIXEL SENSING CIRCUIT

This application claims priority to Korean patent application No. 10-2022-0092021, filed on Jul. 25, 2022, and all the benefits accruing therefrom under 35 U.S.C. § 119, the content of which in its entirety is herein incorporated by reference.

BACKGROUND

Field of Invention

Various embodiments of the disclosure relate to a display device.

Description of Related Art

With the development of information technology, the importance of a display device, which is a connection medium between a user and information, has been emphasized. Accordingly, various kinds of display devices, such as a liquid crystal display device and an organic light-emitting display device, are widely used in various fields.

Characteristics of pixels of display devices may differ from each other for various reasons (e.g., deviation in a fabrication process, degradation in use, or the like). To accurately display an image, the characteristics of the pixels may be desired to be accurately sensed, and a data voltage may be desired to be compensated for based on a result of the sensing before the data voltage is provided to the pixels.

SUMMARY

Conventional sensing methods for sensing characteristics of pixels using integrators are typically operated on the assumption that sensing current to be inputted to a sensing line is linear. However, the conventional sensing methods using the integrators may not be accurate because current which flows through actual transistors and diodes is exponential current, the sensing precision is relatively low.

Various embodiments of the disclosure are directed to a display device which may accurately sense exponential current rather than linear current.

An embodiment of the disclosure provides a display device including: a pixel including a light emitting element; and a sensing channel connected to a first electrode of the light emitting element by a first sensing line, and connected to a second electrode of the light emitting element by a second sensing line. In such an embodiment, the sensing channel includes: an amplifier including a first input terminal connected to the second sensing line; and a first switch which connects an output terminal of the amplifier to the first sensing line.

In an embodiment, the display device may further include a second switch which connects the first electrode of the light emitting element to a first power line.

In an embodiment, a turn-on period of the first switch and a turn-on period of the second switch may not overlap each other.

In an embodiment, The pixel may include: a first transistor including a gate electrode connected to a first node, a first electrode connected to a second power line, and a second electrode connected to a second node; a second transistor including a gate electrode connected to a first scan line, a first electrode connected to a data line, and a second electrode connected to the first node; a third transistor including a gate electrode connected to a second scan line, a first electrode connected to an initialization line, and a second electrode connected to the second node; and a storage capacitor including a first electrode connected to the first node, and a second electrode connected to the second node.

In an embodiment, the first input terminal of the amplifier receives an input voltage independent from an initialization voltage of the initialization line.

In an embodiment, a second input terminal of the amplifier may be connected to the ground.

In an embodiment, the first input terminal of the amplifier may be an inverting terminal, and the second input terminal of the amplifier may be a non-inverting terminal.

In an embodiment, during a display period, the first switch may be in a turned-off state, and the second switch may be in a turned-on state.

In an embodiment, during a diode voltage sensing period for the light emitting element, the first switch may be in a turned-on state, and the second switch may be in a turned-off state.

In an embodiment, during a first period of a threshold voltage sensing period of the first transistor, the first switch may be in a turned-off state, and the second switch may be in a turned-on state. In such an embodiment, during a second period after the first period, the first switch may be in a turned-on state, and the second switch may be in a turned-off state.

In an embodiment, during a mobility sensing period of the first transistor, the first switch may be in a turned-on state, and the second switch may be in a turned-off state.

An embodiment of the disclosure provides a display device including: a pixel including a light emitting element; and a sensing channel connected to a first electrode of the light emitting element by a first sensing line, and connected to at least one transistor of the pixel by a second sensing line. In such an embodiment, the sensing channel includes: an amplifier including a first input terminal connected to the second sensing line; and a first switch which connects an output terminal of the amplifier with the first sensing line.

In an embodiment, the display device may further include a second switch which connects the first electrode of the light emitting element to a first power line.

In an embodiment, a turn-on period of the first switch and a turn-on period of the second switch may not overlap each other.

In an embodiment, the pixel may include: a first transistor including a gate electrode connected to a first node, a first electrode connected to a second power line, and a second electrode connected to a second node; a second transistor including a gate electrode connected to a first scan line, a first electrode connected to a data line, and a second electrode connected to the first node; a third transistor including a gate electrode connected to a second scan line, a first electrode connected to an initialization line, and a second electrode connected to the second node; and a storage capacitor including a first electrode connected to the first node, and a second electrode connected to the second node.

In an embodiment, the at least one transistor may be the third transistor.

In an embodiment, the first input terminal of the amplifier may be connected to the initialization line.

In an embodiment, a second input terminal of the amplifier may be connected to the ground.

In an embodiment, the first input terminal of the amplifier may include an inverting terminal, and the second input terminal of the amplifier may include a non-inverting terminal.

In an embodiment, during a display period, the first switch may be in a turned-off state, and the second switch may be in a turned-on state.

DETAILED DESCRIPTION

Figure 1:
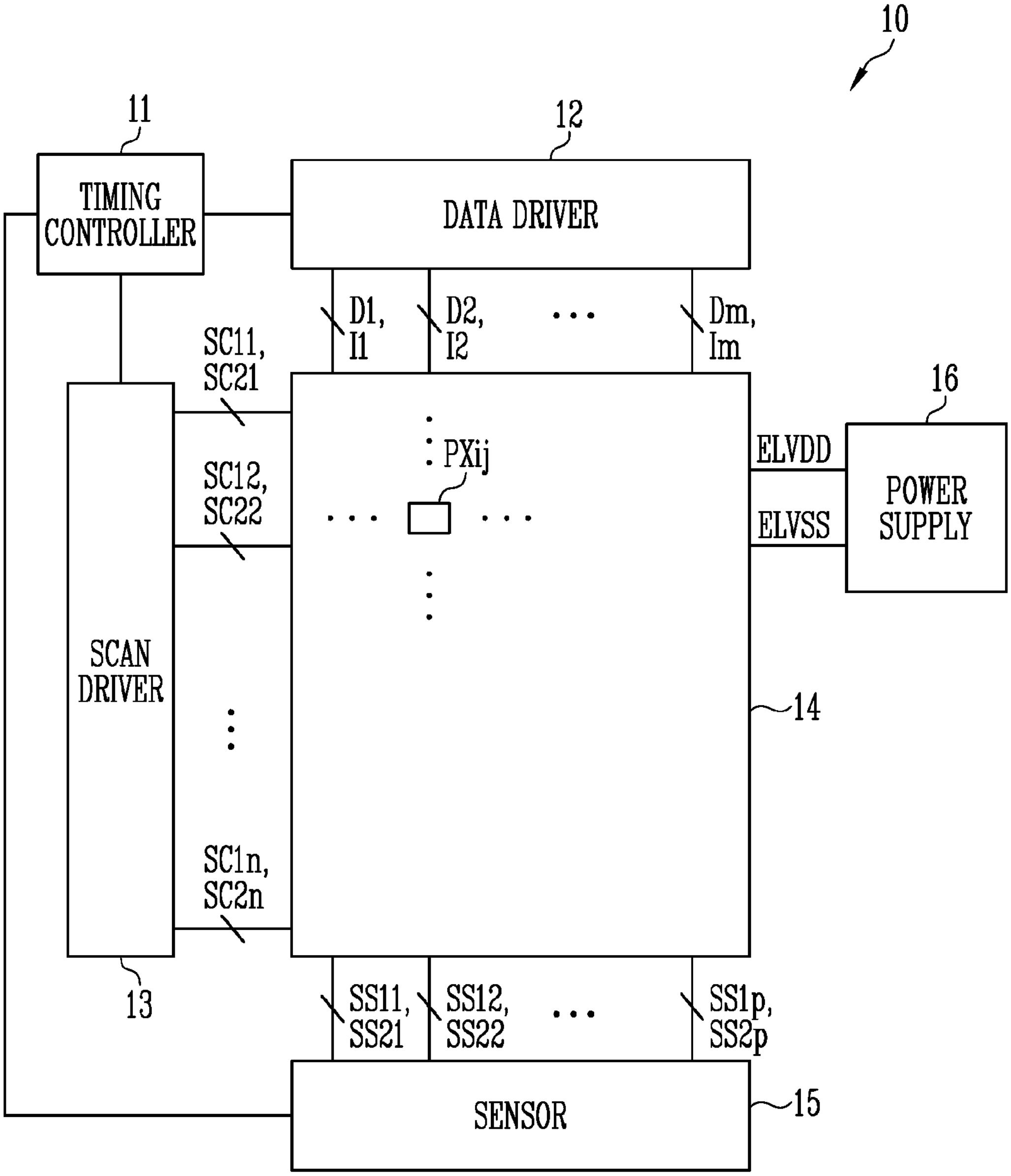
FIG. 1 is a diagram for describing a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

For reference, the size of each component and the thicknesses of lines illustrating the component are arbitrarily represented for the sake of explanation, and the disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a diagram for describing a display device 10 in accordance with an embodiment of the disclosure.

Referring to FIG. 1, the display device 10 in accordance with an embodiment of the disclosure may include a timing controller 11, a data driver 12, a scan driver 13, a pixel component (or a display panel) 14, a sensor 15, and a power supply 16.

The timing controller 11 may receive input grayscale values and control signals for each image frame from an external device, e.g., a processor. Furthermore, the timing controller 11 may receive results of sensing characteristics of the pixels through the sensor 15. The timing controller 11 may compensate for the input grayscale values for the pixels based on the results of the sensing or the sensing results. The timing controller 11 may provide the compensated grayscale values to the data driver 12. Furthermore, the timing controller 11 may provide, to the data driver 12, the scan driver 13, the sensor 15 and the like, control signals suitable for specifications of the respective components to express frames or to display frame images.

The data driver 12 may generate data voltages to be provided to data lines D1, D2, . . . Dm using the compensated grayscale values and the control signals. In an embodiment, for example, the data driver 12 may sample the compensated grayscale values using a clock signal, and apply data voltages corresponding to the compensated grayscale values to the data lines DL1 to DLm on a pixel row-by-pixel row basis. Here, m is an integer greater than 0. In an embodiment, the data driver 12 may generate initialization voltages to be provided to initialization lines I1, I2, . . . , Im. In an embodiment, the initialization voltages to be provided to the initialization lines I1, I2, . . . , Im may also be generated from the power supply 16 or the like. In an embodiment, the number of initialization lines I1, I2, . . . , Im and the number of data lines D1, D2, . . . , Dm may be the same as or different from each other.

The scan driver 13 may receive a clock signal, a scan start signal, or the like from the timing controller 11 and generate first scan signals to be provided to first scan lines SC11, SC12, . . . , SC1*n* and second scan signals to be provided to second scan lines SC21, SC22, . . . , SC2*n*. Here, n is an integer greater than 0.

The scan driver 13 may sequentially supply the first scan signals, each having a turn-on level pulse, to the first scan lines SC11, SC12, . . . , SC1*n*. The scan driver 13 may sequentially supply the second scan signals, each having a turn-on level pulse, to the second scan lines SC21, SC22, . . . , SC2*n*.

In an embodiment, for example, the scan driver 13 may include a first scan driver connected to the first scan lines SC11, SC12, . . . , SC1*n*, and a second scan driver connected to the second scan lines SC21, SC22, . . . , SC2*n*. The first scan driver and the second scan driver each may include scan stages configured in the form of a shift register. The first scan driver and the second scan driver each may generate scan signals in such a way that a scan start signal having a turn-on level pulse shape is sequentially transmitted to a subsequent stage under control of a clock signal.

The sensor 15 may include a plurality of sensing channels. The sensing channels may be connected to the pixels by first sensing lines SS11, SS12, . . . , SS1*b* and second sensing lines SS21, SS22, . . . , SS2*p*. Here, p is an integer greater than 0. Each of the sensing channels may include a log amplifier.

The power supply 16 may provide a first power voltage through a first power line ELVSS, and may provide a second power voltage through a second power line ELVDD. The second power voltage may be set to be greater than the first power voltage when light emitting elements display an image. The first power voltage and the second power voltage may be voltages to be provided in common to a plurality of pixels included in the pixel component 14.

The pixel component 14 includes pixels. Each pixel PXij may be connected to a corresponding data line, a corresponding initialization line, a corresponding first scan line, a corresponding second scan line, a corresponding first sensing line, a corresponding second sensing line, the first power line ELVSS, and the second power line ELVDD (refer to FIG. 2). The pixels of the pixel component 14 each may receive a data voltage from the data line based on scan signals received from the first scan line and the second scan line, and store the data voltage therein. The pixels each may emit light at a luminance corresponding to the stored data voltage to display an image.

Figure 2:
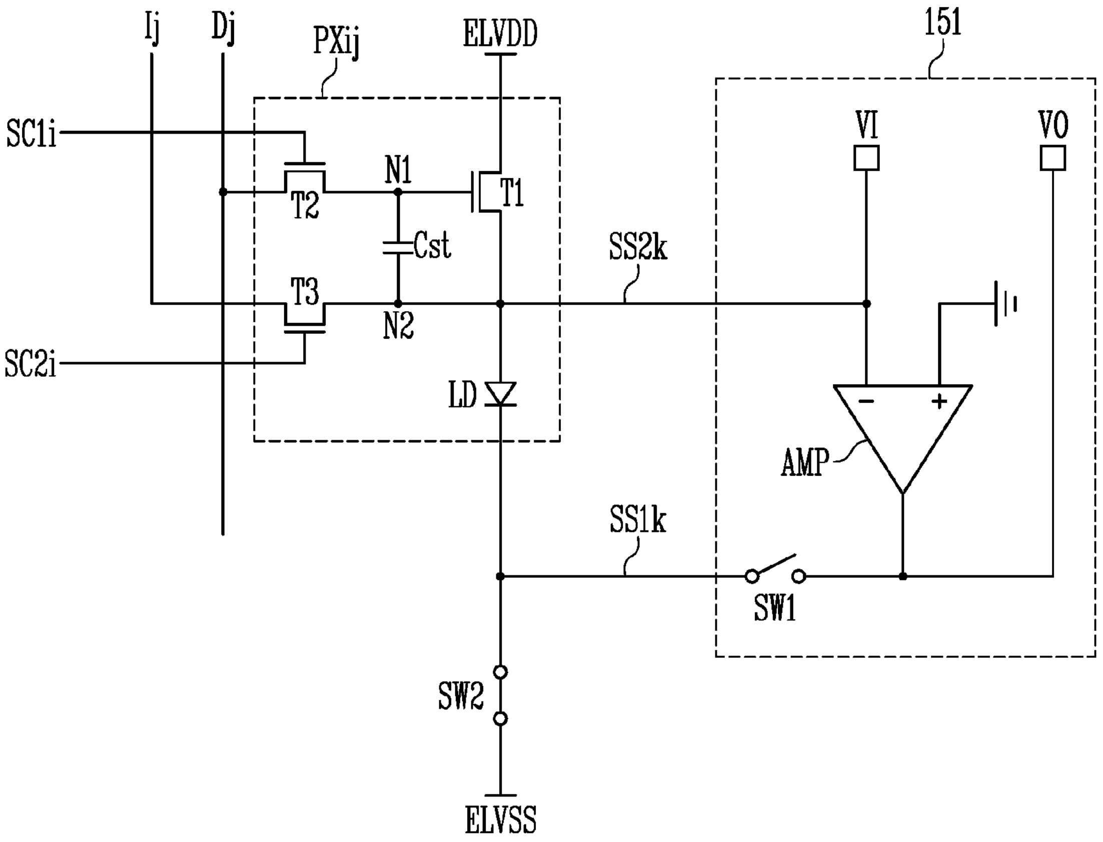
FIG. 2 is a diagram for describing a pixel and a sensing channel in accordance with an embodiment of the disclosure.

FIG. 2 is a diagram for describing a pixel PXij and a sensing channel 151 in accordance with an embodiment of the disclosure.

Referring to FIG. 2, an embodiment of the pixel PXij may include a first transistor T1, a second transistor T2, a third transistor T3, a storage capacitor Cst, and a light emitting element LD.

The transistors T1, T2, and T3 each may be formed of (or defined by) an N-type transistor. In an embodiment, the transistors T1, T2, and T3 each may be formed of a P-type transistor. In an embodiment, the transistors T1, T2, and T3 may be formed of a combination of an N-type transistor and a P-type transistor. The term "P-type transistor" is a general name for transistors in which the amount of flowing current increases when a voltage difference between a gate electrode and a source electrode increases in a negative direction. The term "N-type transistor" is a general name for transistors in which the amount of flowing current increases when a voltage difference between a gate electrode and a source electrode increases in a positive direction. Each transistor may be configured in various forms such as a thin film transistor (TFT), a field effect transistor (FET), and a bipolar junction transistor (BJT).

The first transistor T1 may include a gate electrode connected to a first node N1, a first electrode connected to the second power line ELVDD, and a second electrode connected to a second node N2. The first transistor T1 may be referred to as "driving transistor".

The second transistor T2 may include a gate electrode connected to the first scan line SC1*i*, a first electrode connected to the data line Dj, and a second electrode connected to the first node N1.

The third transistor T3 may include a gate electrode connected to the second scan line SC2*i*, a first electrode connected to the initialization line Ij, and a second electrode connected to the second node N2.

The storage capacitor Cst may include a first electrode connected to the first node N1, and a second electrode connected to the second node N2.

The light emitting element LD may include a first electrode connected to the first power line ELVSS, and a second electrode connected to the second node N2. Here, the display device 10 may further include a second switch SW2. The second switch SW2 may connect the first electrode of the light emitting element LD to the first power line ELVSS. The location of the second switch SW2 may be changed depending on embodiments. In an embodiment, for example, the second switch SW2 may be disposed in the power supply 16, or may be located in the pixel component 14.

The light emitting element LD may include or be formed of a light emitting diode. In an embodiment, for example, the light emitting element LD may include or be formed of (or defined by) an organic light emitting diode, an inorganic light emitting diode, a quantum dot light emitting diode, or the like. Although FIG. 2 illustrates an embodiment where only one light emitting element LD in each pixel PXij, the light emitting element LD may be formed of a plurality of subminiature light emitting elements in an alternative embodiment. in such an embodiment, the plurality of subminiature light emitting elements may be connected in series, parallel, or series-parallel to each other.

The sensing channel 151 may be connected to the first electrode of the light emitting element LD by the first sensing line SS1*k*, and may be connected to the second electrode of the light emitting element LD by the second sensing line SS2*k*. The sensing channel 151 may include an amplifier AMP and a first switch SW1.

The amplifier AMP may include a first input terminal connected to the second sensing line SS2*k*. A second input terminal of the amplifier AMP may be connected to a ground (or an earth). In an alternative embodiment, the second input terminal of the amplifier AMP may be connected to a reference power supply rather than the ground. The first input terminal may be an inverting terminal. The second input terminal may be a non-inverting terminal. In an embodiment, the first input terminal of the amplifier AMP may receive an initialization voltage of the initialization line Ij and an independent input voltage. The input voltage may be received from an input terminal VI.

The first switch SW1 may connect an output terminal VO of the amplifier AMP to the first sensing line SS1*k*. Although not illustrated, the sensor 15 or the timing controller 11 may include an analog-to-digital converter connected to the output terminal VO. The analog-to-digital converter may convert a sensing voltage, which is an analog voltage, outputted from the output terminal VO of the amplifier AMP to a sensing result which is a digital signal. The converted sensing result may be used to compensate for a grayscale value for a target pixel.

In an embodiment, a turn-on period of the first switch SW1 and a turn-on period of the second switch SW2 may not overlap each other. In an embodiment, for example, during a display period, the first switch SW1 may be in a turned-off state, and the second switch SW2 may be in a turned-on state.

Figure 3:
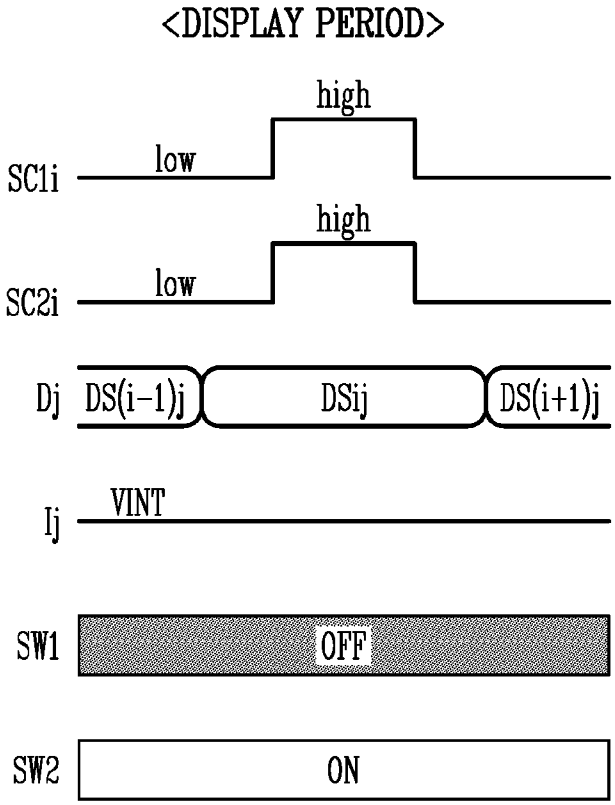
FIG. 3 is a diagram for describing a display period of the pixel of FIG. 2.

FIG. 3 is a diagram for describing a display period of the pixel of FIG. 2.

Referring to FIG. 3, during the display period, an initialization voltage VINT may be applied to the sensing line Ij. During the display period, the first switch SW1 may be in the turned-off state, and the second switch SW2 may be in the turned-on state.

During the display period, data voltages DS(i−1)j, DSij, and DS(i+1)j may be sequentially applied to the data line Dj on a horizontal period-by-horizontal period basis. A scan signal having a turn-on level (a high level) may be applied to the first scan line SC1*i* during a corresponding horizontal period. Furthermore, in synchronization with the first scan line SC1*i*, a scan signal having a turn-on level may also be applied to the second scan line SC2*i*. In an alternative embodiment, during the display period, a scan signal having a turn-on level may be always applied to the second scan lines SC2*i*, that is, the scan signal having the turn-on level may be applied to the second scan lines SC2*i* during an entire duration of the display period.

In an embodiment, for example, when scan signals each having a turn-on level are applied to the first scan line SC1*i* and the second scan line SC2*i*, the second transistor T2 and the third transistor T3 may be turned on. Therefore, a voltage corresponding to a difference between a data voltage Dsij and an initialization voltage VINT may be stored in the storage capacitor Cst of the pixel Pxij.

In the pixel Pxij, depending on a difference in voltage between the gate electrode and the source electrode of the first transistor T1, the amount of driving current flowing through a driving path connecting the second power line ELVDD, the first transistor T1, and the first power line ELVSS may be determined. The emission luminance of the light emitting element LD may be determined based on the amount of driving current.

Thereafter, when scan signals each having a turn-off level may be applied to the first scan line SC1*i* and the second scan line SC2*i*, the second transistor T2 and the third transistor T3 may be turned off. Therefore, regardless of a change in voltage of the data line Dj, a difference in voltage between the gate electrode and the source electrode of the first transistor T1 may be maintained by the storage capacitor Cst, and the emission luminance of the light emitting element LD may be maintained.

Figure 4:
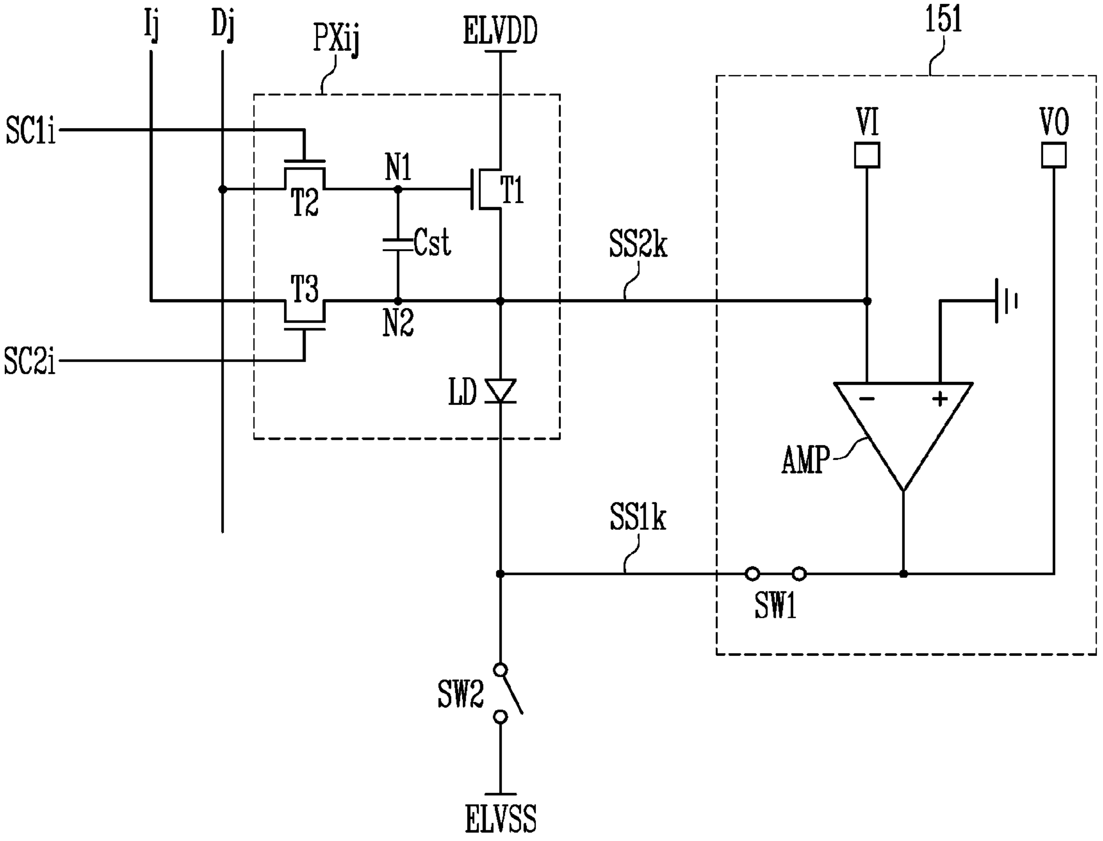
FIGS. 4 and 5 are diagrams for describing a diode voltage sensing period of the pixel of FIG. 2.
Figure 5:
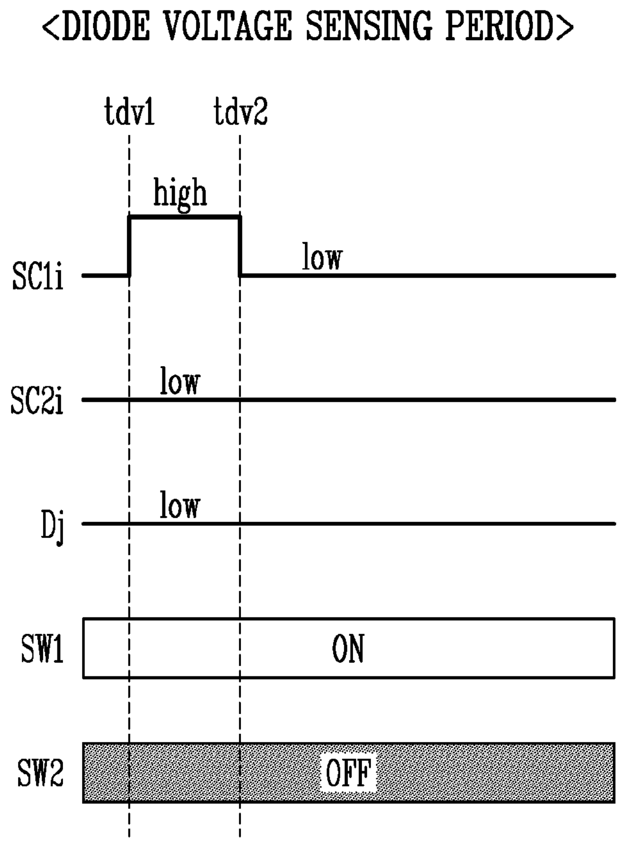

FIGS. 4 and 5 are diagrams for describing a diode voltage sensing period of the pixel of FIG. 2. Referring to FIGS. 4 and 5, during the diode voltage sensing period for the light emitting element LD, the first switch SW1 may be turned on, and the second switch SW2 may be turned off.

First, a scan signal having a turn-on level (a high level) may be applied to the first scan line SC1*i* during a time period from a time point tdv1 to a time point tdv2. Here, a scan signal having a turn-off level may be applied to the second scan line SC2*i* during the diode voltage sensing period. Here, a specific input voltage may be applied to the input terminal VI of the sensing channel 151.

Accordingly, a data voltage having a low level may be applied to the first node N1 through the turned-on second transistor T2, and an input voltage may be applied to the second node N2 through the input terminal VI. Here, a difference between the data voltage and the input voltage may be less than the threshold voltage of the first transistor T1. Therefore, the first transistor T1 may remain turned off. Here, the expression "the data voltage is at a low level" merely means that the first transistor T1 is turned off, rather than meaning that the data voltage is at a specific level. In such an embodiment, the voltage level of the data voltage may be a voltage level that allows the first transistor T1 to be turned off with regard to a relationship with the input voltage.

Here, sensing current may flow to the output terminal VO after successively passing through the input terminal VI, the light emitting element LD, and the first switch SW1. Here, current that flows through the light emitting element LD may be expressed by the following equation 1.

$$ILD = IF \cdot e^{\left(\frac{-q \cdot VVO}{n \cdot K \cdot T}\right)} = \frac{VVI}{RT} \quad \text{[Equation 1]}$$

Here, ILD denotes the current that flows through the light emitting element LD, and $$IF \cdot e^{\left(\frac{-q \cdot VVO}{n \cdot K \cdot T}\right)}$$

is obtained by modeling the current ILD that flows through the light emitting element LD. Here, q denotes charge on an electron, VVO is an output voltage of the output terminal VO, and n denotes a preset constant and may have a value in a range from 1 to 2. K denotes Botzmann constant, and T denotes an absolute temperature value. IF denotes the magnitude of current. VVI denotes an input voltage of the input terminal VI, and RI denotes a resistance value between the input terminal VI and the inverting terminal of the amplifier AMP.

The following equation 2 may be obtained by rearranging Equation 1 for the output voltage VVO.

$$VVO = -k \cdot \ln\left(\frac{VVI}{IF \cdot RI}\right) \quad \text{[Equation 2]}$$

Here, k denotes a constant obtained by simply representing q, n, K, and T of Equation 1. As expressed in Equation 2, in an embodiment, the sensing current that flows through the light emitting element LD and has an exponential form may be accurately reflected in the output voltage VVO. Therefore, compared to a conventional sensing channel including an integrator which performs a sensing operation on the assumption that the sensing current is linear sensing current, the sensing accuracy of the sensing channel 151 according to an embodiment may be increased.

It may mean that, as the output voltage VVO is decreased, the degree of degradation of the light emitting element LD is increased. As the degree of degradation of the light emitting element LD is increased, driving current thereof for expressing a same luminance may be increased. In an embodiment, for example, the timing controller 11 may set a compensation grayscale value to a value that is increasingly greater than an input grayscale value as a measured output voltage VVO of the corresponding pixel Pxij is decreased.

Figure 6:
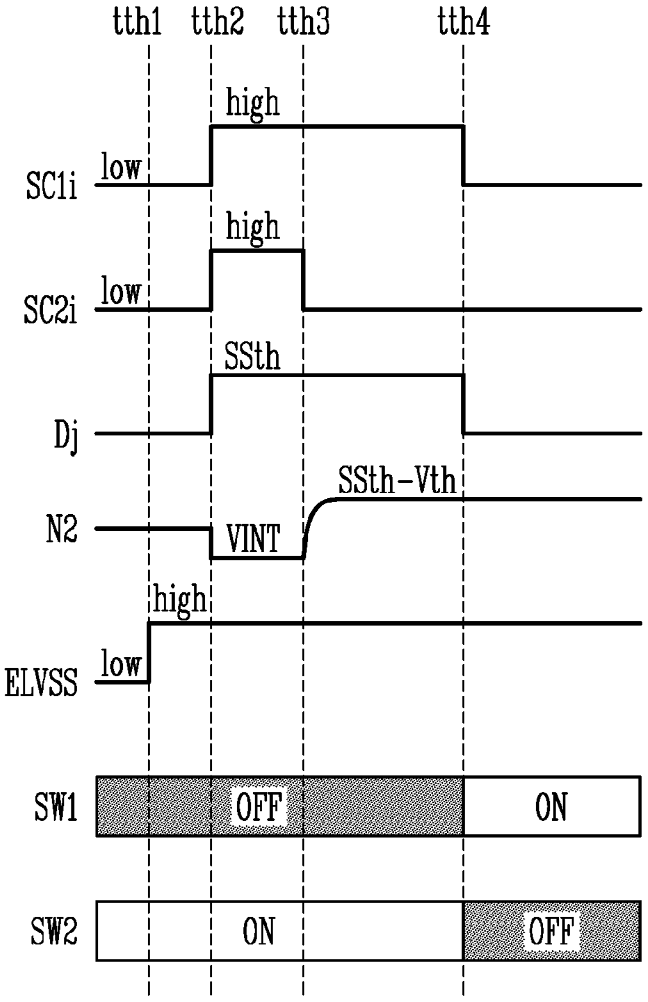
FIG. 6 is a diagram for describing a threshold voltage sensing period of the pixel of FIG. 2.

FIG. 6 is a diagram for describing a threshold voltage sensing period of the pixel of FIG. 2.

Referring to FIG. 6, during a first period (from a time point tth1 to a time point tth4) of the threshold voltage sensing period of the first transistor T1, the first switch SW1 may be in a turned-off state, and the second switch SW2 may be in a turned-on state. During a second period (from the time point tth4) after the first period (from the time point tth1 to the time point tth4), the first switch SW1 may be in a turned-on state, and the second switch SW2 may be in a turned-off state.

First, at the time point tth1, the first power voltage of the first power line ELVSS may be increased from a low level to a high level, such that current may be prevented from leaking from the second node N2 to the first power line ELVSS during the first period (from the time point tth1 to the time point tth4).

Next, at a time point tth2, scan signals each having a turn-on level (a high level) may be applied to the first scan line SC1*i* and the second scan line SC2*i*, such that the second transistor T2 and the third transistor T3 may be turned on. Here, a sensing voltage SSth may be applied to the data line Dj so that the first node N1 can be set to the sensing voltage SSth. An initialization voltage VINT may be applied to the initialization line Ij so that the second node N2 can be set to the initialization voltage VINT. A difference (SSth-Vth) between the sensing voltage SSth and the initialization voltage VINT may be set to a value greater than the threshold voltage of the first transistor T1, so that the first transistor T1 may be turned on.

Next, at a time point tth3, a scan signal having a turn-off level (a low level) may be applied to the second scan line SC2*i*, so that the third transistor T3 can be turned off. Because the first transistor T1 is in a turned-on state, current flows from the second power line ELVDD to the second node N2, and the voltage of the second node N2 is gradually increased. When the voltage of the second node N2 reaches a voltage corresponding to SSth-Vth, the first transistor T1 is turned off. Here, Vth denotes the threshold voltage of the first transistor T1.

Next, at the time point tth4, a scan signal having a turn-off level (a low level) may be applied to the first scan line SC1*i*, so that the second transistor T2 can be turned off. Here, a separate voltage is not applied to the input terminal VI of the sensing channel 151, so that the voltage VVI of the input terminal VI may be the same as the voltage SSth-Vth of the second node N2. Because the input voltage VVI and the output voltage VVO can be figured out from the diode voltage sensing period of FIG. 5, a current level IF taking into account a degradation degree of the light emitting element LD of Equation 2 can be calculated. Therefore, when the output voltage VVO of the output terminal VO is measured, the threshold voltage Vth of the first transistor T1 can be obtained based on Equation 2.

Figure 7:
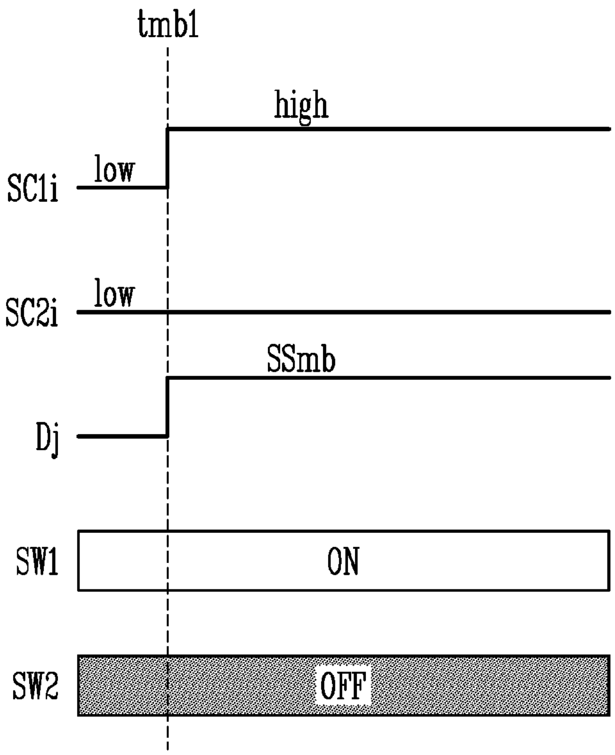
FIG. 7 is a diagram for describing a mobility sensing period of the pixel of FIG. 2.

FIG. 7 is a diagram for describing a mobility sensing period of the pixel of FIG. 2.

Referring to FIG. 7, during a mobility sensing period of the first transistor T1, the first switch SW1 may be turned on, and the second switch SW2 may be turned off.

At a time point tmb1 during the mobility sensing period, a scan signal having a turn-on level (a high level) may be applied to the first scan line SC1*i*, so that the second transistor T2 can be turned on. Here, a sensing voltage SSmb is applied to the data line Dj, so that the voltage of the first node N1 may be set to the sensing voltage SSmb. Here, an input voltage VVI is applied to the input terminal VI, so that the voltage of the second node N2 may be set to the input voltage VVI. A difference between the sensing voltage SSmb and the input voltage VVI may be greater than the threshold voltage of the first transistor Ti.

Hence, current Id obtained by the following equation 3 may flow from the second power line ELVDD to the second node N2.

$$Id = \frac{1}{2}(u \times Co)\left(\frac{W}{L}\right)(Vgs - Vth)^2 \quad \text{[Equation 3]}$$

Here, Id denotes current flowing through the first transistor T1. U denotes mobility. Co denotes a capacitance formed by a channel, an insulating layer, and the gate electrode of the first transistor T1. W denotes a width of the channel of the first transistor T1. L denotes a length of the channel of the first transistor T1. Vgs denotes a difference in voltage between the gate electrode and the source electrode of the first transistor Ti. Vth denotes a threshold voltage value of the first transistor T1.

Here, Co, W, L each may be a constant. Vth may be detected by a certain detection method (e.g., refer to FIG. 6). Vgs denotes a difference between the sensing voltage SSmb and the input voltage VVI. In an embodiment of FIG. 7, current ILD that flows through the light emitting element LD may be the sum of current supplied from the input terminal VI and current Id flowing from the second power line ELVDD. Therefore, when the current Id can be obtained by measuring the increased output voltage VVO of the output terminal VO, and the mobility u of the first transistor T1 can be obtained with reference to Equation 3.

Figure 8:
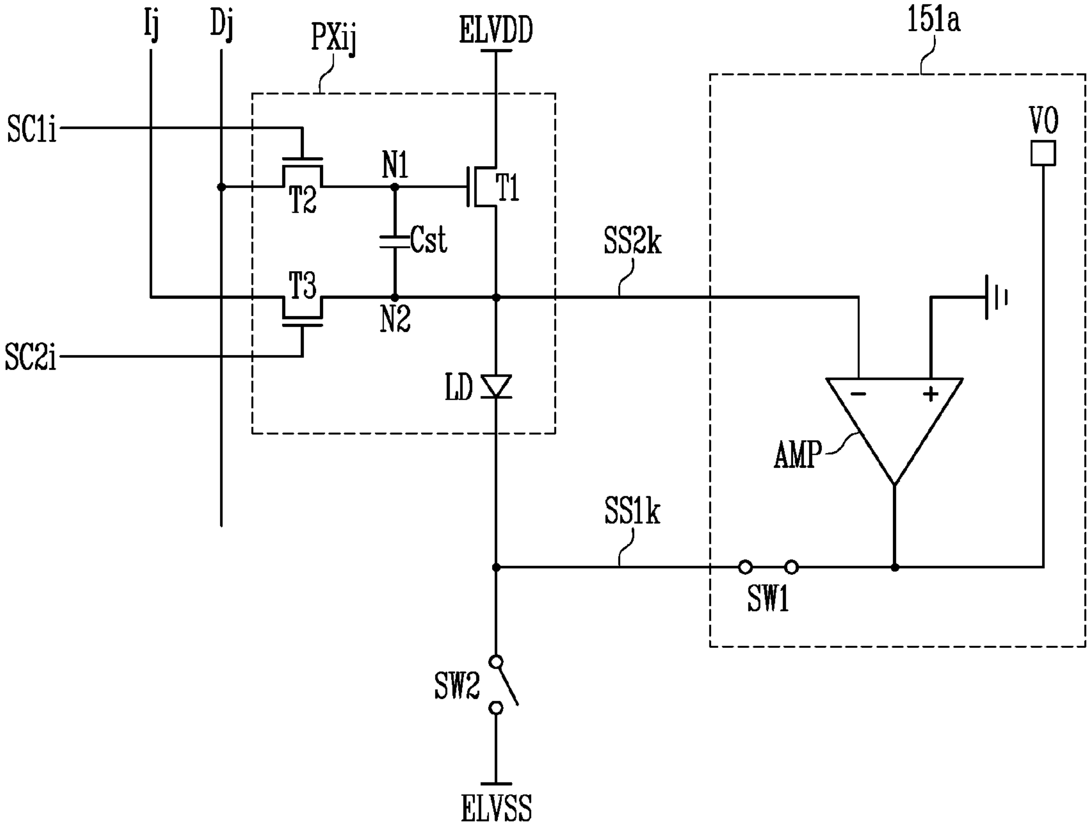
FIG. 8 is a diagram for describing a pixel and a sensing channel in accordance with an alternative embodiment of the disclosure.

FIG. 8 is a diagram for describing a pixel Pxij and a sensing channel 151*a* in accordance with an alternative embodiment of the disclosure.

The sensing channel 151*a* of FIG. 8 is substantially the same as the sensing channel 151 of FIG. 4 except that the sensing channel 151*a* does not include a separate input terminal VI. In the embodiment FIG. 8, the voltage of the second node N2 may be set through the initialization line Ij and the third transistor T3 in lieu of the input terminal VI. In the embodiment of FIG. 8, because the display period and the threshold voltage sensing period may be driven in the same manner as those of FIGS. 3 and 6, redundant explanation thereof will be omitted.

Figure 9:
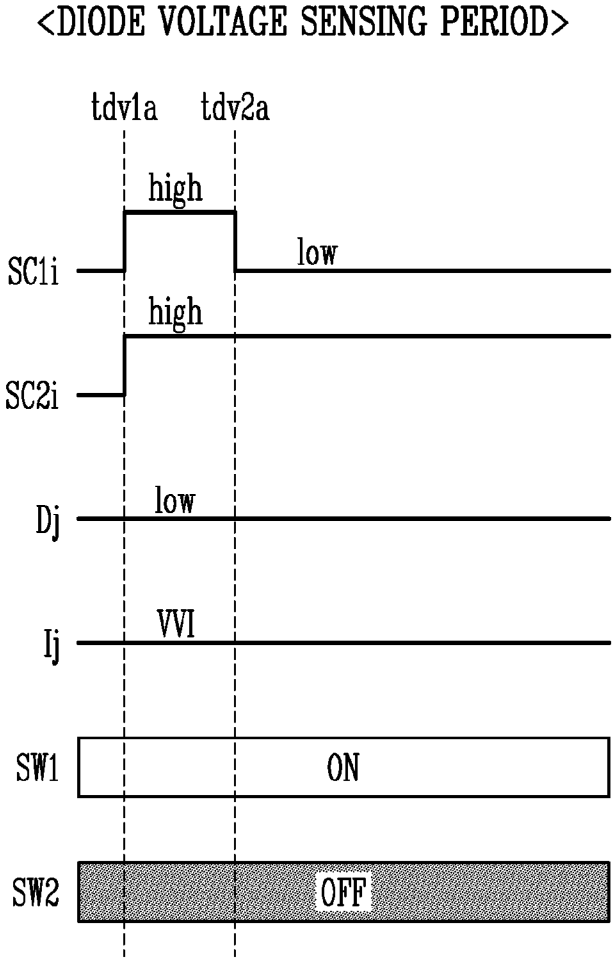
FIG. 9 is a diagram for describing a diode voltage sensing period of the pixel of FIG. 8.

FIG. 9 is a diagram for describing a diode voltage sensing period of the pixel of FIG. 8.

The operation of the embodiment of FIGS. 8 and 9 is different from that of the embodiment of FIGS. 4 and 5 in that an input voltage VVI is applied to the initialization line Ij, and a scan signal having a turn-on level (a high level) is applied to the second scan line SC2*i* at time point tdv1*a*. In the embodiment of FIG. 8, the input voltage VVI may be supplied to the second node N2 through the initialization line Ij in lieu of the input terminal VI. The other configuration is the same as that described above with reference to FIG. 5, and any repetitive detailed description thereof will be omitted.

Figure 10:
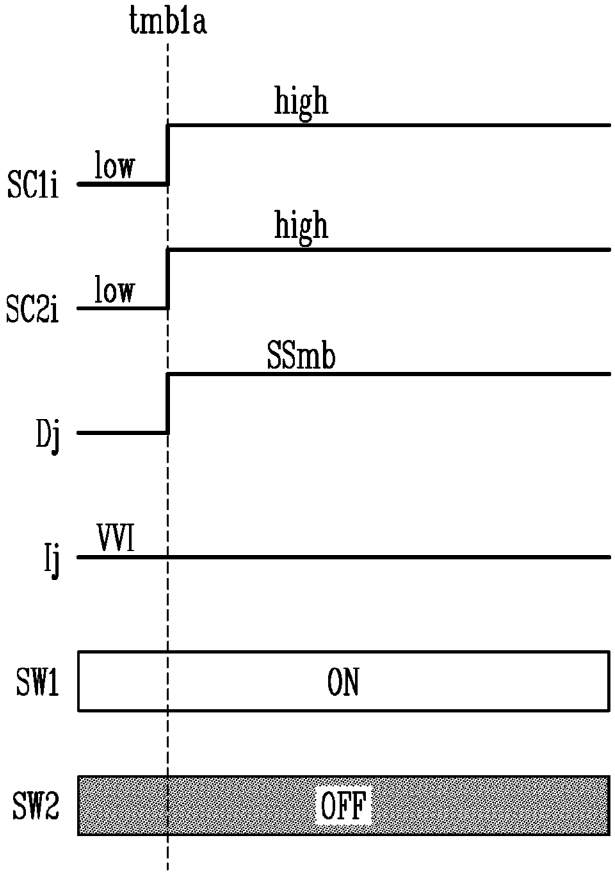
FIG. 10 is a diagram for describing a mobility sensing period of the pixel of FIG. 8.

FIG. 10 is a diagram for describing a mobility sensing period of the pixel of FIG. 8.

The operation of the embodiment of FIGS. 8 and 10 is different from that of the embodiment of FIGS. 4 and 7 in that an input voltage VVI is applied to the initialization line Ij, and a scan signal having a turn-on level (a high level) is applied to the second scan line SC2*i* at time point tmb1*a*. In such an embodiment, the input voltage VVI may be supplied to the second node N2 through the initialization line Ij in lieu of the input terminal VI. The other configuration is the same as that described above with reference to FIG. 7, and any repetitive detailed description thereof will be omitted.

Figure 11:
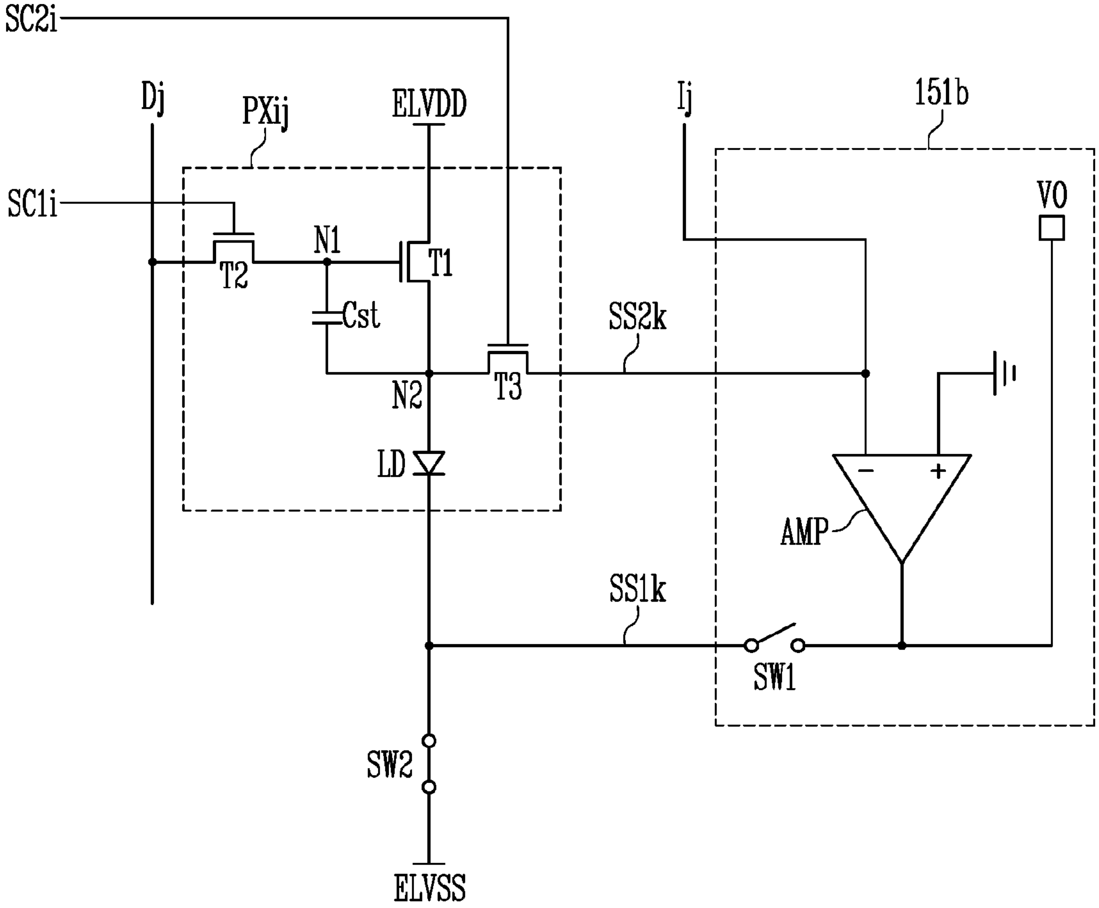
FIG. 11 is a diagram for describing a pixel and a sensing channel in accordance with another alternative embodiment of the disclosure.

FIG. 11 is a diagram for describing a pixel Pxij and a sensing channel 151*b* in accordance with another alternative embodiment of the disclosure.

The sensing channel 151*b* of FIG. 11 is substantially the same as the sensing channel 151 of FIG. 4 except that the sensing channel 151*b* does not include a separate input terminal VI. Furthermore, the sensing channel 151*b* of FIG. 11 is different from the sensing channels 151 and 151*a* of FIGS. 4 and 8 in that the sensing channel 151*b* is connected to at least one transistor T3 by the second sensing line SS2*k*. Here, the first input terminal (e.g., an inverting terminal) of the amplifier AMP may be connected to the initialization line Ij.

In the embodiment FIG. 11, the voltage of the second node N2 may be set through the initialization line Ij and the third transistor T3 in lieu of the input terminal VI. In an embodiment of FIG. 11, a display period may be driven in the same manner as that described above with reference to FIG. 3, and any repetitive detailed description thereof will be omitted. In the embodiment of FIG. 11, because the diode voltage sensing period and the mobility sensing period may be driven in the same manner as those of FIGS. 9 and 10, and any repetitive detailed description thereof will be omitted.

Figure 12:
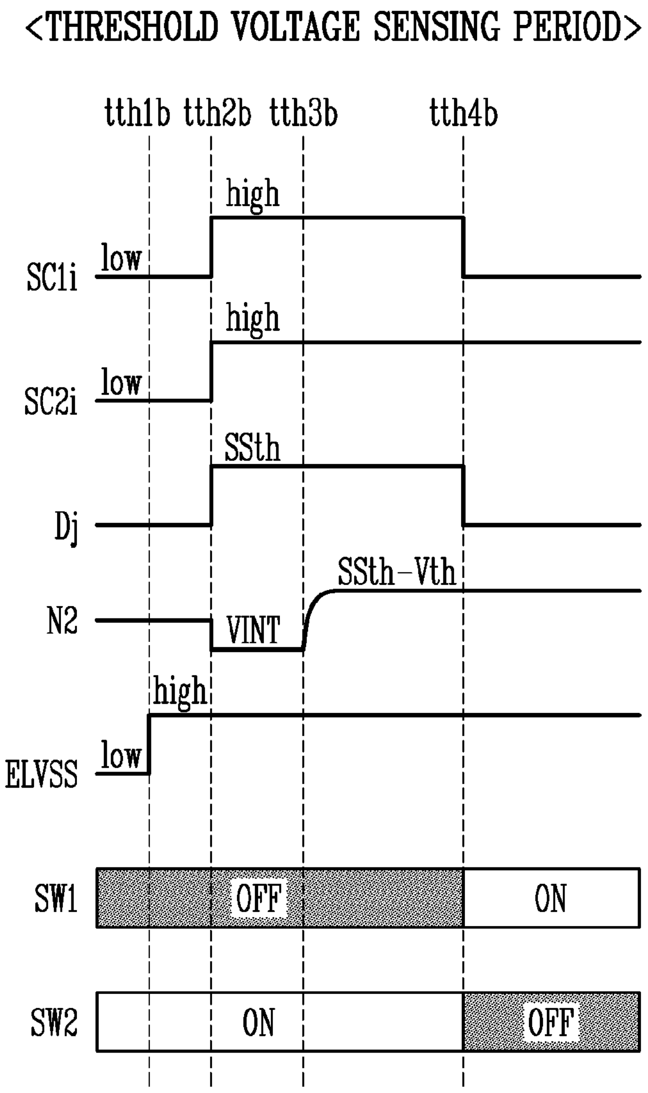
FIG. 12 is a diagram for describing a threshold voltage sensing period of the pixel of FIG. 11.

FIG. 12 is a diagram for describing a threshold voltage sensing period of the pixel of FIG. 11.

The operation of the embodiment of FIG. 11 shown in FIG. 12 is different from the that of the embodiment of FIG. 4 described above with reference to FIG. 6 in that a scan signal applied to the second scan line SC2*i* is maintained at a turn-on level (a high level) at a time point tth3*b*. Here, at the time point tth3*b*, the initialization line Ij may float, so that the voltage of the second node N2 can be increased to the voltage SSth-Vth. The other driving method is the same as that described above with reference to FIG. 6, and any repetitive detailed description thereof will be omitted.

FIGS. 13 to 19 are diagrams for describing the configuration of a display device in accordance with an embodiment. Reference numerals in FIGS. 13 to 19 are independent from reference numerals in FIGS. 1 to 12.

Figure 13:
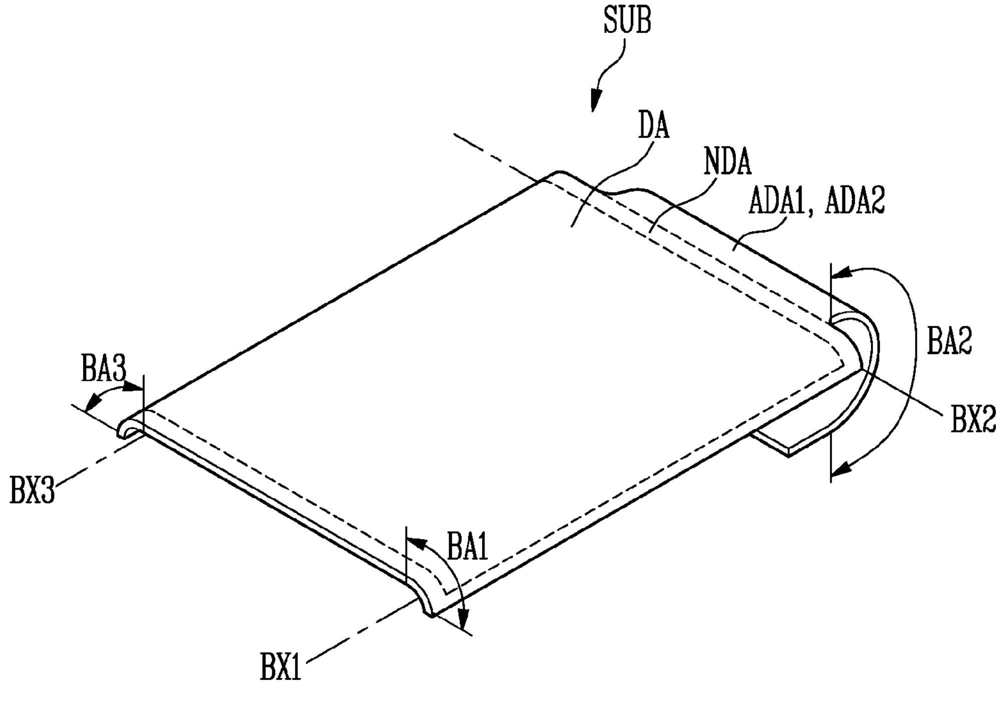
FIGS. 13 to 19 are diagrams for describing the configuration of a display device in accordance with an embodiment.
Figure 14:
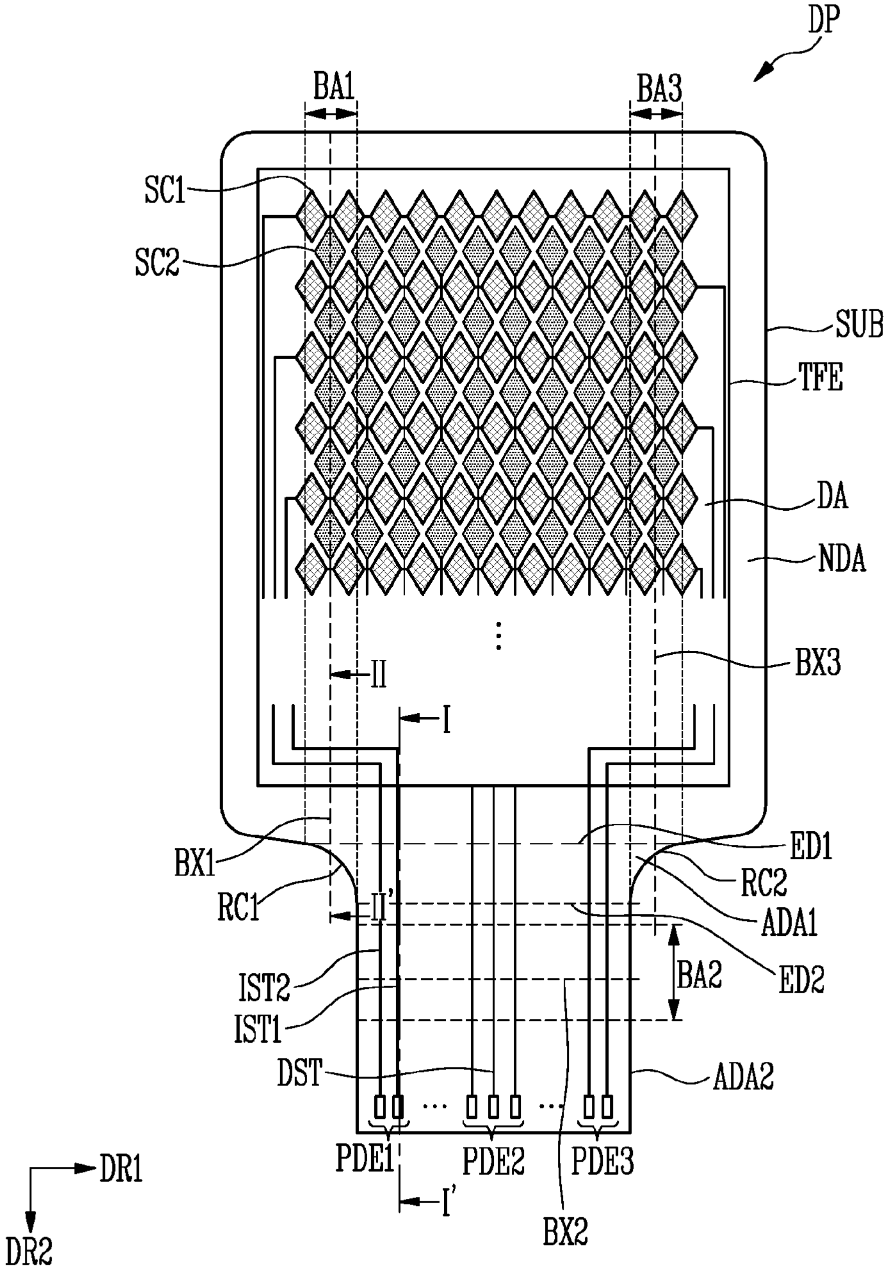

FIG. 13 is a perspective view of a substrate SUB in accordance with an embodiment of the disclosure. FIG. 14 is a plan view of a display panel DP in accordance with an embodiment of the disclosure.

In the following embodiments, a plan view may be defined in a first direction DR1 and a second direction DR2, and the height or thickness may be defined in a third direction DR3 (refer to FIG. 15). The first direction DR1, the second direction DR2, and the third direction DR3 may be perpendicular to each other.

In an embodiment, as shown in FIGS. 13 and 14, the substrate SUB may include a display area DA, a non-display area NDA, a first additional area ADA1, and a second additional area ADA2.

The display area DA may have a rectangular shape. Each corner of the display area DA may have an angled shape or a curved shape. In an embodiment where the display panel PD is a circular display, the display area DA may have a circular shape. Alternatively, the display area DA may have a polygonal shape other than a rectangular shape, an elliptical shape, and the like. As such, the shape of the display area DA may vary depending on products.

Pixels may be disposed in the display area DA. Depending on the type of display device DP, each of the pixels may include a light emitting diode, or a liquid crystal layer.

The non-display area NDA may enclose a periphery of the display area DA. In an embodiment, for example, the non-display area NDA may have a rectangular shape. Each corner of the non-display area NDA may have an angled shape or a curved shape. FIG. 14 illustrates an embodiment where each corner of the non-display area NDA has a curved shape. The non-display area NDA may have a circular shape. Since minimizing the non-display area NDA is desired for forming a narrow bezel structure, the shape of the non-display area NDA may be similar to that of the display area DA.

The first additional area ADA1 may be disposed between the non-display area NDA and the second additional area ADA2. The first additional area ADA1 may be connected with the non-display area NDA at a first boundary ED1. The first additional area ADA1 may be connected with the second additional area ADA2 at a second boundary ED2. The first boundary ED1 and the second boundary ED2 each may extend in the first direction DR1.

The first additional area ADA1 may be reduced in width from the first boundary ED1 to the second boundary ED2. In other words, the width of the first additional area ADA1 with respect to the first direction DR1 may be reduced in the second direction DR2. Hence, the first additional area ADA1 may include a first side edge RC1 and a second side edge RC2 which are curved. The side edges RC1 and RC2 may be convex toward the inside of the substrate (e.g., the center of the substrate).

FIG. 14 illustrates an embodiment where the first additional area ADA1 includes two side edges RC1 and RC2 in the first direction DR1 and a direction opposite thereto. In an embodiment, the first additional area ADA1 may include only the first side edge RC1 by matching a boundary of the first additional area ADA1 with respect to the first direction DR1 to a boundary of the non-display area NDA. In an embodiment, the first additional area ADA1 may include only the second side edge RC2 by matching a boundary of the first additional area ADA1 with respect to the direction opposite to the first direction DR1 to a boundary of the non-display area NDA.

The second additional area ADA2 may have a rectangular shape. Each corner of the second additional area ADA2 with respect to the second direction DR2 may have an angled shape or a curved shape. FIG. 14 illustrates an embodiment where each corner of the second additional area ADA2 with respect to the second direction DR2 has an angled shape.

An encapsulation layer TFE may be disposed on the pixels. In an embodiment, for example, the encapsulation layer TFE may cover the pixels in the display area DA, and a boundary of the encapsulation layer TFE may be located in the non-display area NDA. The encapsulation layer TFE may cover light emitting elements of the pixels in the display area DA and circuit elements, thereby preventing the light emitting elements and the circuit elements from being damaged by external water or impacts.

Sensing electrodes SC1 and SC2 may be disposed on the encapsulation layer TFE. The sensing electrodes SC1 and SC2 may sense a touch, hovering, a gesture, proximity of the body of the user, or the like. The sensing electrodes SC1 and SC2 may be formed in various shapes depending on sensing types including a resistive type, a capacitive type, an electromagnetic type (EM), and an optical type. In an embodiment, for example, in an embodiment where the sensing electrodes SC1 and SC2 form a capacitive type sensing structure, the sensing electrodes SC1 and SC2 may form a self-capacitive type sensing structure, a mutual-capacitive type sensing structure, or the like. Hereinafter, for convenience of description, embodiments where the sensing electrodes SC1 and SC2 form a mutual-capacitive type sensing structure.

In an embodiment where the sensing electrodes SC1 and SC2 form a mutual-capacitive type sensing structure, a driving signal may be transmitted through a sensing line corresponding to the first sensing electrode SC1, and a sensing signal may be received through a sensing line corresponding to the second sensing electrode SC2 that forms mutual capacitance with the first sensing electrode SC1. Mutual capacitance between the first sensing electrode SC1 and the second sensing electrode SC2 may vary when a conductive object or the body of the user is close thereto, so that a touch of the user can be detected by a variation in the sensing signal resulting from the variation in the mutual capacitance. In an embodiment, a driving signal is transmitted through the sensing line corresponding to the second sensing electrode SC2, and a sensing signal may be received through a sensing line corresponding to the first sensing electrode SC1 that forms mutual capacitance with the second sensing electrode SC2.

The pads PED1, PDE2, and PDE3 may be disposed in the second additional area ADA2. First and third pads PDE1 and PDE3 may be connected to the sensing electrodes SC1 and SC2 disposed over the encapsulation layer by sensing lines IST1 and IST2. The first and third pads PDE1 and PDE3 may be connected to an external touch integrated chip (IC). Furthermore, second pads PDE2 may be connected to the pixels disposed under the encapsulation layer TFE or a driver for the pixels by display lines DST. The driver may include a scan driver, an emission driver, a data driver, and the like. The driver may be disposed under the encapsulation layer TFE, or disposed in an external display IC connected to the display device DP through the second pads PDE2.

In an embodiment where the display device DP is a mutual capacitance display device, a touch integrated circuit (IC) may transmit a driving signal through the first sensing line IST1, and receive a sensing signal through the second sensing line IST2. In an embodiment, a driving signal may be transmitted through the second sensing line IST2, and a sensing signal may be received through the first sensing line IST1. For reference, in an embodiment where the display device DP is a self-capacitance display device, a driving method between the first sensing line IST1 and the second sensing line IST2 is the same as that described above. The display lines DST may include a control line, a data line, a power line, and the like, and provide signals to allow the pixels to display an image. Such signals may be provided from the driver that is connected to the display lines DL.

FIG. 13 illustrates the substrate SUB that is in a bent state. FIG. 14 illustrates the substrate SUB that is not in the bent state. The display device DP may be bent, as illustrated in FIG. 13, after elements are stacked on the substrate SUB while the substrate SUB is not in the bent state, as illustrated in FIG. 14.

The substrate SUB may include a first bending area BA1 that extends from the first side edge RC1 of the first additional area ADA1 to overlap the non-display area NDA. In addition, the first bending area BA1 may extend to overlap the display area DA. In other words, the display area DA, the non-display area NDA, and the first additional area ADA1 each may partially overlap the first bending area BA1. The first bending area BA1 may have a width with respect to the first direction DR1, and the length direction thereof may be the second direction DR2. A first bending axis BX1 may be defined as a folding line extending in the second direction DR2 in a center of the first bending area BA1. In an embodiment, the first bending area BA1 may be a portion that is reduced in stress by removing some insulating layers, unlike other peripheral portions. In an embodiment, the first bending area BA1 may have the same configuration as that of the other peripheral portions.

The substrate SUB may include a third bending area BA3 that extends from the second side edge RC2 of the first additional area ADA1 to overlap the non-display area NDA. In addition, the third bending area BA3 may extend to overlap the display area DA. In other words, the display area DA, the non-display area NDA, and the first additional area ADA1 each may partially overlap the third bending area BA3. The third bending area BA3 may have a width with respect to the first direction DR1, and the length direction thereof may be the second direction DR2. A third bending axis BX3 may be defined as a folding line extending in the second direction DR2 in a center of the third bending area BA3. In an embodiment, the third bending area BA3 may be a portion that is reduced in stress by removing some insulating layers, unlike other peripheral portions. In an embodiment, the third bending area BA3 may have the same configuration as that of the other peripheral portions.

The second additional area ADA2 may include a second bending area BA2. The second bending area BA2 may have a width with respect to the second direction DR1, and the length direction thereof may be the first direction DR1. A second bending axis BX2 may be defined as a folding line extending in the first direction DR1 in a center of the second bending area BA2. In an embodiment, the second bending area BA2 may be a portion that is reduced in stress by removing some insulating layers, unlike other peripheral portions. In an embodiment, the second bending area BA2 may have the same configuration as that of the other peripheral portions.

The first to third bending areas BA1, BA2, and BA3 may not overlap each other.

Here, the term "fold" means that the display device may be changed from the original shape thereof to other shapes rather than being fixed in shape, and has meanings including, being "folded" or "curved" along one or more bending axes, or "rolled" in a scroll manner. In an embodiment, side bezel widths with respect to the first direction DR1 of the display device DP and the direction opposite to the first direction DR1 may be reduced due to the first and third bending areas BA1 and BA3. Furthermore, a side bezel width with respect to the second direction DR2 of the display device DP may be reduced due to the second bending area BA2.

Figure 15:
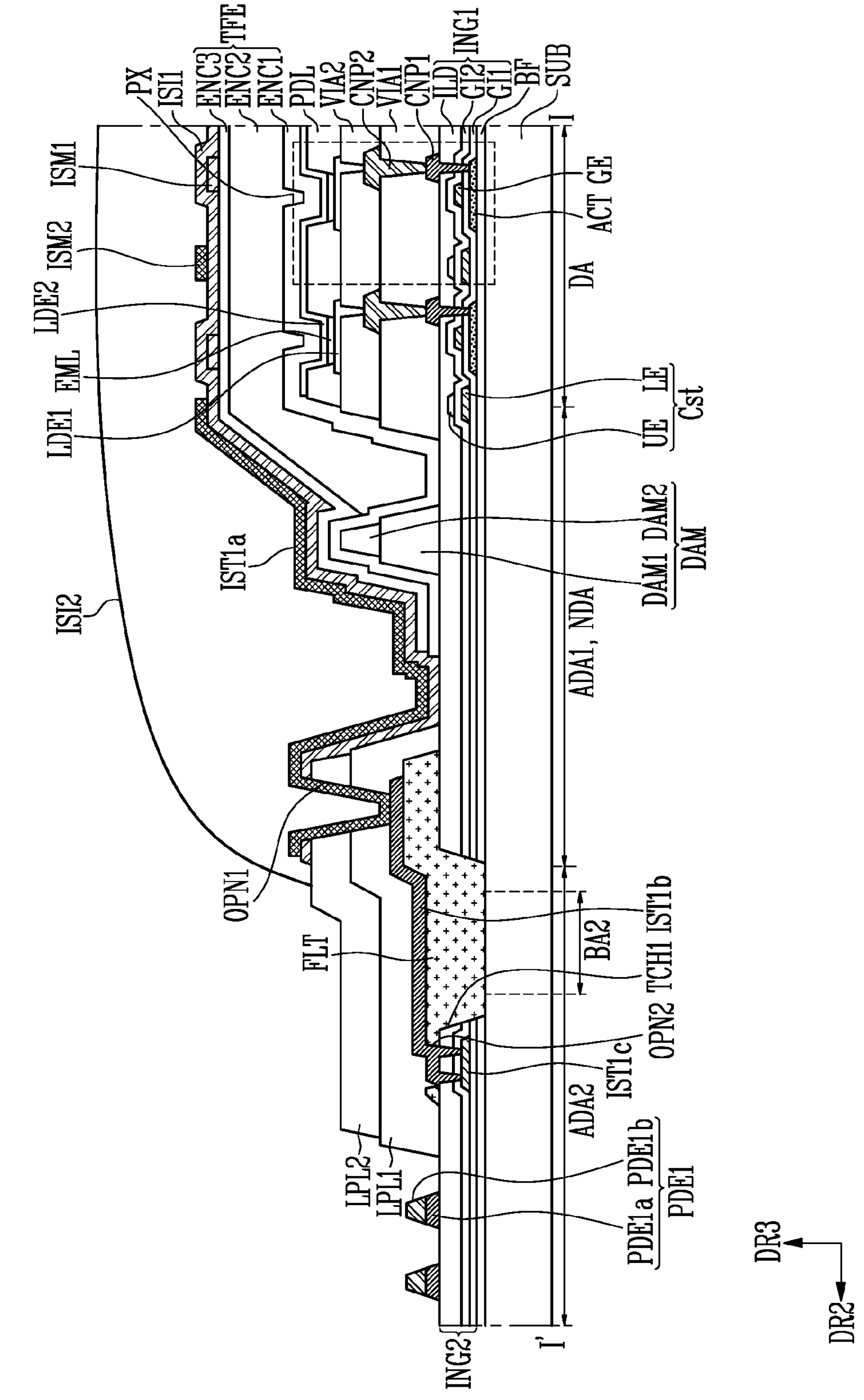

FIG. 15 is a cross-sectional view taken along line I-I' of FIG. 14 in accordance with an embodiment. It is assumed that line I-I' of FIG. 14 passes through the first pad PDE1 and the first sensing line IST1.

First, the display area DA will be described. In an embodiment of the disclosure, a plurality of pixels PXL may be provided in the display area DA. Each pixel PX may include a transistor that is connected to a corresponding line of the display lines DST, a light emitting element that is connected to the transistor, and a capacitor Cst. For convenience of illustration and description, FIG. 15 illustrates one transistor, one light emitting element, and one capacitor Cst that are provided for one pixel PX.

The substrate SUB may include or be made of insulating material such as glass or resin. In an embodiment, the substrate SUB may include or be made of material having flexibility to be bendable or foldable, and have a single structure or a multilayer structure.

In an embodiment, for example, the substrate SUB may include at least one selected from the following: polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material that forms the substrate SUB may be changed in various ways, and the substrate SUB may also include or be made of fiber-reinforced plastic (FRP) or the like.

In an embodiment, for example, where the substrate SUB has a multilayer structure, a single layer or a plurality of layers including or made of inorganic material such as silicon nitride, silicon oxide, or silicon oxynitride may be interposed between a plurality of layers of the multilayer structure.

A buffer layer BF may be disposed to cover the substrate SUB. The buffer layer BL may prevent impurities from diffusing into a channel CH of the transistor. The buffer layer BF may be an inorganic insulating layer including or formed of an inorganic material. In an embodiment, for example, the buffer layer BF may include or be formed of silicon nitride, silicon oxide, silicon oxynitride, or the like. The buffer layer BF may be omitted depending on the material of the substrate SUB and the processing conditions. In an embodiment, a barrier layer may be further provided.

An active layer ACT may be disposed on the buffer layer BF. The active layer ACT may be patterned to form a channel, a source electrode, and a drain electrode of the transistor, or a line. The active layer ACT includes or is formed of a semiconductor material. The active layer ACT may be a semiconductor pattern including or formed of polysilicon, amorphous silicon, an oxide semiconductor, or the like. The channel of the transistor may be a semiconductor pattern undoped with impurities and an intrinsic semiconductor. The source electrode, the drain electrode, and the line each may be a semiconductor pattern doped with impurities. The impurities may include an n-type impurity, a p-type impurity, or other metals.

A first gate insulating layer GI1 may be disposed on the buffer layer BF to cover the active layer ACT. The first gate insulating layer GI1 may be an inorganic insulating layer including or formed of inorganic material. Inorganic insulating material such as polysiloxane, silicon nitride, silicon oxide, or silicon oxynitride may be used as the inorganic material.

A gate electrode GE of the transistor and a lower electrode LE of the capacitor Cst may be disposed on the first gate insulating layer GI1. The gate electrode GE may overlap an area of the active layer ACT that corresponds to the channel.

The gate electrode GE and the lower electrode LE may include or be made of a metal. In an embodiment, for example, the gate electrode GE may include or be made of at least one selected from metals such as gold (Au), silver (Ag), aluminum (Al), molybdenum (Mo), chrome (Cr), titanium (Ti), nickel (Ni), neodymium (Nd), and copper (Cu), or an alloy of the metals. The gate electrode GE may have a single-layer structure, but is not limited thereto, and the gate electrode GE may have a multilayer structure formed by stacking two or more materials selected from the metals and alloys described above.

A second gate insulating layer GI2 may be disposed on the first gate insulating layer GI1 to cover the gate electrode GE and the lower electrode LE. The second gate insulating layer GI2 may be an inorganic insulating layer including or formed of inorganic material. Polysiloxane, silicon nitride, silicon oxide, silicon oxynitride, or the like may be used as the inorganic material.

The upper electrode UE of the capacitor Cst may be disposed on the second gate insulating layer GI2. The capacitor upper electrode UE may include or be formed of metal. In an embodiment, for example, the upper electrode UE may include or be made of at least one selected from metals such as gold (Au), silver (Ag), aluminum (Al), molybdenum (Mo), chrome (Cr), titanium (Ti), nickel (Ni), neodymium (Nd), and copper (Cu), or an alloy of the metals. The upper electrode UE may have a single layer structure, but it is not limited thereto, and the upper electrode UE may have a multilayer structure formed by stacking two or more materials selected from the metals and alloys described above.

The lower electrode LE and the upper electrode UE may be provided with the second insulating layer GI2 therebetween, thus forming the capacitor Cst. Although FIG. 15 illustrates an embodiment where the capacitor Cst has a double layer electrode structure including the lower electrode LE and the upper electrode UE, in an alternative embodiment, the capacitor Cst may have a triple layer electrode structure using an active layer ACT, or a triple layer electrode structure or an electrode structure having four or more layers using an electrode provided in a same layer as a first connection pattern CNP1.

The interlayer insulating layer ILD may be disposed on the second insulating layer GI2 to cover the upper electrode UE. The interlayer insulating layer ILD may be an inorganic insulating layer including or formed of inorganic material. Polysiloxane, silicon nitride, silicon oxide, silicon oxynitride, or the like may be used as the inorganic material.

In an embodiment, for convenience of description, the first gate insulating layer GI1, the second gate insulating layer GI2, and the interlayer insulating layer ILD may be referred to as a first insulating layer group ING1. The first insulating layer group ING1 may cover a portion of the transistor. In an embodiment, the first insulating layer group ING1 may further include a buffer layer BF.

The first connection pattern CNP1 may be disposed on the interlayer insulating layer ILD. The first connection pattern CNP1 may contact each of the source electrode and the drain electrode of the active layer ACT through contact holes that are defined or formed in the interlayer insulating layer ILD, the second gate insulating layer GI2, and the first gate insulating layer GI1.

The first connection pattern CNP1 may include or be formed of a metal. In an embodiment, for example, each of the source electrode SE and the drain electrode DE may include or be made of at least one selected from metals such as gold (Au), silver (Ag), aluminum (Al), molybdenum (Mo), chrome (Cr), titanium (Ti), nickel (Ni), neodymium (Nd), and copper (Cu), or an alloy of the metals.

Although not illustrated, in an embodiment, a passivation layer may cover the first connection pattern CNP1. The passivation layer may be an inorganic insulating layer including or formed of inorganic material. Polysiloxane, silicon nitride, silicon oxide, silicon oxynitride, or the like may be used as the inorganic material.

A first via layer VIA1 may cover the passivation layer or the transistor. The first via layer VIA1 may be an organic insulating layer including or formed of organic material. Organic insulating material such as a polyacryl compound, a polyimide compound, a fluorocarbon compound such as Teflon®, or a benzocyclobutene compound may be used as the organic material. The organic layer may be deposited by a method such as evaporation.

A second connection pattern CNP2 may be connected to the first connection pattern CNP1 through the opening of the first via layer VIA1. The second connection pattern CNP2 may include or be made of at least one selected from metals such as gold (Au), silver (Ag), aluminum (Al), molybdenum (Mo), chrome (Cr), titanium (Ti), nickel (Ni), neodymium (Nd), and copper (Cu), or an alloy of the metals.

The second via layer VIA2 may cover the first via layer VIA1 and the second connection pattern CNP2. The second via layer VIA2 may be an organic insulating layer including or formed of organic material. Organic insulating material such as a polyacryl compound, a polyimide compound, a fluorocarbon compound such as Teflon®, or a benzocyclobutene compound may be used as the organic material.

A first light-emitting-element electrode LDE1 may be connected to the second connection pattern CNP2 through an opening of the second via layer VIA2. Here, in an embodiment, the first light-emitting-element electrode LDE1 may be an anode of the light emitting element.

In an alternative embodiment, the configurations of the second via layer VIA2 and the second connection pattern CNP2 may be omitted, and the first light-emitting-element electrode LDE1 may be directly connected to the first contact electrode CNP1 through the opening of the first via layer VIA1.

The first light-emitting-element electrode LDE1 may include or be formed of a metal layer including or made of Ag, Mg, Al, Pt, Pd, Au, Ni, Nd, Ir, Cr, or an alloy of them, and/or indium tin oxide (ITO), indium zinc oxide (IZO), zinc oxide (ZnO), indium tin zinc oxide (ITZO), or the like. The first light-emitting-element electrode LDE1 may include or be made of one kind of metal, but it is not limited to this, and it may include or be made of two or more kinds of metals, e.g., an alloy of Ag and Mg.

The first light-emitting-element electrode LDE1 may include or be formed of a transparent conductive layer to provide an image in the downward direction of the substrate SUB, or may include or be formed of a metal reflective layer and/or a transparent conductive layer to provide an image in the upward direction of the substrate SUB.

A pixel defining layer PDL for defining an emission area of each pixel PXL may be provided on the substrate SUB on which the first light-emitting-element electrode LDE1 or the like is formed. The pixel defining layer PDL may be an organic insulating layer including or made of organic material. Organic insulating material such as a polyacryl compound, a polyimide compound, a fluorocarbon compound such as Teflon®, or a benzocyclobutene compound may be used as the organic material.

The pixel defining layer PDL may expose an upper surface of the first light-emitting-element electrode LDE1 and protrude from the substrate SUB along the perimeter of the pixel PX. An emission layer EML may be disposed in an area of the pixel PX enclosed by the pixel defining layer PDL.

The light emitting layer EML may include low molecular or high molecular material. The low-molecular material may include copper phthalocyanine (CuPc), N,N'-Di(naphthalene-1-yl)-N,N'-diphenyl-benzidine (NPB), tris-8-hydroxyquinoline aluminum (Alq3), or the like. Such materials may be formed by a vacuum evaporation method. The high-molecular material may include PEDOT, PPV (poly-phenylenevinylene)-based material, polyfluorene-based material, or the like.

The emission layer EML may have a single layer structure, or a multilayer structure including various functional layers. In an embodiment where the light emitting layer EML has a multilayer structure, the light emitting layer EML may have a structure in which a hole injection layer (HIL), a hole transport layer (HTL), an emission layer (EML), an electron transport layer (ETL), an electron injection layer (EIL), and the like are stacked in a single structure or a complex structure. The light emitting layer EML may be formed by a screen printing method, an inkjet printing method, a laser induced thermal imaging (LITI) method, or the like.

In an embodiment, at least a portion of the light emitting layer EML may be integrally formed over a plurality of first light emitting element electrodes LDE1, or may be individually provided or patterned to respectively correspond to a plurality of first light emitting element electrodes LDE1.

A second light-emitting-element electrode LDE2 may be disposed on the light emitting layer EML. The second light-emitting-element electrode LDE2 may be provided for each pixel PX. Alternatively, the second light-emitting-element electrode LDE2 may be provided to cover most of the display area DA and be shared by a plurality of pixels PX.

The second light-emitting-element electrode LDE2 may be used as a cathode or an anode, depending on embodiments. In an embodiment where the first light-emitting-element electrode LDE1 is an anode, the second light-emitting-element electrode LDE2 may be used as a cathode. In an embodiment where the first light-emitting-element electrode LDE1 is a cathode, the second light-emitting-element electrode LDE2 may be used as an anode.

The second light-emitting-element electrode LDE2 may include or be formed of a metal layer including or made of Ag, Mg, Al, Pt, Pd, Au, Ni, Nd, Ir, Cr, or the like, and/or a transparent conductive layer including or made of indium tin oxide (ITO), indium zinc oxide (IZO), zinc oxide (ZnO), indium tin zinc oxide (ITZO), or the like. In an embodiment of the disclosure, the second light-emitting-element electrode LDE2 may be formed of a multilayer structure having two or more layers including a thin metal layer. In an embodiment, for example, the second light-emitting-element electrode LDE2 may be formed of have a triple layer structure of ITO/Ag/ITO.

The second light-emitting-element electrode LDE2 may include or be formed of a metal reflective layer and/or a transparent conductive layer to provide an image in a downward direction of the substrate SUB, or may include or be formed of a transparent conductive layer to provide an image in an upward direction of the substrate SUB.

An assembly including the first light-emitting-element electrode LDE1, the light emitting layer EML, and the second light-emitting-element electrode LDE2 may be referred to as a light emitting element.

The encapsulation layer TFE may be disposed on the second light-emitting-element electrode LDE2. The encapsulation layer TFE may be formed of or defined by a single layer or multiple layers. In an embodiment, the encapsulation layer TFE may include first to third encapsulation layers ENC1, ENC2, and ENC3. The first to third encapsulation layers ENC1, ENC2, and ENC3 may include or be made of organic material and/or inorganic material. The third encapsulation layer ENC3, which is disposed at the outermost position, may include or be made of inorganic material. In an embodiment, for example, the first encapsulation layer ENC1 may include or be formed of an inorganic layer including or made of inorganic material, the second encapsulation layer ENC2 may include or be formed of an organic layer including or made of organic material, and the third encapsulation layer ENC3 may include or be formed of an inorganic layer including made of inorganic material. In a layer including or formed of an inorganic material, the resistance to penetration of water or oxygen is superior compared to a layer including or formed of an organic material, but the inorganic material is vulnerable to a crack because the inorganic material has low flexibility. In an embodiment, since the first encapsulation layer ENC1 and the third encapsulation layer ENC3 include or are made of inorganic material, and the second encapsulation layer ENC2 include or is made of organic material, the spread of a crack may be effectively prevented. Here, a layer including or made of organic material, i.e., the second encapsulation layer ENC2, may be fully covered with the third encapsulation layer ENC3 so that an edge of the second encapsulation layer ENC2 can be effectively prevented from being exposed to the outside. In an embodiment, organic insulating material such as a polyacryl compound, a polyimide compound, a fluorocarbon compound such as Teflon®, or a benzocyclobutene compound may be used as the organic material. Polysiloxane, silicon nitride, silicon oxide, silicon oxynitride, or the like may be used as the inorganic material.

The light emitting layer EML that forms a light emitting element may be easily damaged by external water, oxygen, or the like. The encapsulation layer TFE covers and protect the light emitting layer EML. The encapsulation layer TFE may cover the display area DA and extend to the non-display area NDA that is formed outside the display area DA. However, insulating layers including or made of organic material are advantageous in terms of flexibility, elasticity, or the like, but are prone to penetration of water or oxygen compared to that of an insulation layer including or made of inorganic material. In an embodiment of the disclosure, to prevent water or oxygen from penetrating into the insulating layers including or made of organic material, the insulating layers including or made of organic material may be covered with the insulating layers including or made of inorganic material such that edges of the insulating layers including or made of organic material are not exposed to the outside. In an embodiment, for example, the first via layer VIA1, the second via layer VIA2, and the pixel defining layer PDL, which include or are made of organic material, may be covered with the first encapsulation layer ENC1 rather than successively extending to the non-display area NDA. Hence, an upper surface of the pixel defining layer PDL and sidewalls of the first via layer VIA1, the second via layer VIA2, and the pixel defining layer PDL may be encapsulated by the encapsulation layer TFE including inorganic material, and thus prevented from being exposed to the outside.

The layer structure or material of the encapsulation layer TFE is not limited to those described above, and may be changed in various ways. In an embodiment, for example, the encapsulation layer TFE may include a plurality of organic material layers and a plurality of inorganic material layers that are alternately stacked.

A first sensing electrode layer ISM1 may be disposed on the encapsulation layer TFE. In an embodiment, an additional buffer layer may be disposed between the first sensing electrode layer ISM1 and the encapsulation layer TFE. The first sensing electrode layer ISM1 may include or be formed of a metal layer including or made of Ag, Mg, Al, Pt, Pd, Au, Ni, Nd, Ir, Cr, or the like, and/or a transparent conductive layer including or made of an indium tin oxide (ITO), an indium zinc oxide (IZO), a zinc oxide (ZnO), an indium tin zinc oxide (ITZO), or the like.

A first sensing insulating layer ISM may be disposed on the first sensing electrode layer ISM1. The first sensing insulating layer ISM may be an inorganic insulating layer including formed of inorganic material. Inorganic insulating material such as polysiloxane, silicon nitride, silicon oxide, or silicon oxynitride may be used as the inorganic material.

A second sensing electrode layer ISM2 may be disposed on the first sensing insulating layer ISM. The second sensing electrode layer ISM2 may include or be formed of a metal layer including or made of Ag, Mg, Al, Pt, Pd, Au, Ni, Nd, Ir, Cr, or the like, and/or a transparent conductive layer including or made of an indium tin oxide (ITO), an indium zinc oxide (IZO), a zinc oxide (ZnO), an indium tin zinc oxide (ITZO), or the like.

Various input sensing components that may be formed using the first sensing electrode layer ISM1, the first sensing insulating layer ISI1, and the second sensing electrode layer ISM2 will be described below with reference to FIGS. 17 to 19.

In an embodiment of FIG. 15, a first pattern IST1*a* of the first sensing layer IST1 may be formed by patterning the second sensing electrode layer ISM2.

A second sensing insulating layer ISI2 may be disposed on the second sensing electrode layer ISM2. The second sensing insulating layer ISI2 may include or be formed of an organic layer. In an embodiment, for example, organic insulating material such as a polyacryl compound, a polyimide compound, a fluorocarbon compound such as Teflon®, or a benzocyclobutene compound may be used as the organic material. In an embodiment, for example, the second sensing insulating layer ISI2 may include or be formed of polymethyl methacrylate, polydimethylsiloxane, polyimide, acrylate, polyethylen terephthalate, polyethylen naphthalate, or the like.

Next, the non-display area NDA, the first additional area ADA1, and the second additional area ADA2 will be described. In a cross-sectional view of FIG. 15, the non-display area NDA and the first additional area ADA1 is not particularly distinguished from one another. In the following description of the non-display area NDA and the second additional area ADA2, any repetitive detailed description of the same features as those described above will be omitted or simplified.

In an embodiment, a dam DAM may be disposed on a boundary of the second encapsulation layer ENC2. In an embodiment, for example, the dam DAM may be disposed between a planarization layer FLT and the second encapsulation layer ENC2. The dam DAM may have a multilayer structure, for example, including a first dam DAM1 and a second dam DAM2. In an embodiment, for example, the first and second dams DAM1 and DAM2 may include or be made of an organic material. The first and second dams DAM1 and DAM2 each may correspond to any one of the first via layer VIA1, the second via layer VIA2, and the pixel defining layer PDL. In an embodiment, for example, in an embodiment where the first dam DAM1 is formed using a same material as that of the first via layer VIA1 through a same process, the second dam DAM2 may be formed using a same material as that of the second via layer VIA2 or the pixel defining layer PDL through a same process. Alternatively, in an embodiment where the first dam DAM1 includes or is formed of the same material as that of the second via layer VIA2 through a same process, the second dam DAM2 may be formed using a same material as that of the pixel defining layer PDL through a same process. In addition, in an embodiment where a spacer is disposed or formed on the pixel defining layer PDL of the display area DA, the dam DAM may include or be formed of the same material as that of the spacer.

The dam DAM may prevent the organic material of the second encapsulation layer ENC2 that has high fluidity from overflowing out of the dam DAM during a fabrication process. The first and third encapsulation layers ENC1 and ENC3 that include or are made of inorganic material may extend and cover the dam DAM so that adhesive force with the substrate SUB or other layers over the substrate SUB can be enhanced.

The first pad PDE1 may be disposed on the substrate SUB and spaced apart from the planarization layer FLT. The first pad PDE1 may be supported by a second insulating layer group ING2. Insulating layers of the second insulating layer group ING2 may respectively correspond to the insulating layers of the first insulating layer group ING1. The first pad PDE1 may include a first pad electrode PDE1*a* and a second pad electrode PDE1*b*. The first pad electrode PDE1*a* may include or be formed of a same material as that of the first connection pattern CNP1. The second pad electrode PDE1*b* may include or be formed of a same material as that of the second connection pattern CNP2.

The planarization layer FLT may be disposed on the substrate SUB and spaced apart from an area that covers the encapsulation layer TFE. The planarization layer FLT may be an organic insulating layer including or made of organic material. Organic insulating material such as a polyacryl compound, a polyimide compound, a fluorocarbon compound such as Teflon®, or a benzocyclobutene compound may be used as the organic material.

In an embodiment, the planarization layer FLT may be formed before the first connection pattern CNP1 is formed after the interlayer insulating layer ILD has been formed. Therefore, the planarization layer FLT and the first via layer VIA1 may be formed through different processes from each other. In an embodiment, the planarization layer FLT and the first via layer VIA1 may include different organic materials from each other.

One end of the planarization layer FLT may cover the first insulating layer group ING1. Furthermore, a portion of the planarization layer FLT that corresponds to the second bending area BA2 may be charged into a first trench TCH1 between the first insulating layer group ING1 and the second insulating layer group ING2.

Since the inorganic insulating layers are greater in hardness and less in flexibility than the organic insulating layers, a crack may be more likely to occur in the inorganic insulating layers. When cracks occur in the inorganic insulating layers, the cracks may spread to lines on the inorganic insulating layers, such that a defect such as line disconnection may be caused.

In an embodiment, as illustrated in FIG. 15, the first trench TCH1 may be formed by removing the inorganic insulating layers from the second bending area BA2, so that the first insulating layer group ING1 and the second insulating layer group ING2 may be separated from each other. In an embodiment, as shown in FIG. 15, all of the inorganic insulating layers corresponding to the area of the first trench TCH1 may be removed. Alternatively, some inorganic insulating layers may remain in other embodiments. In such an embodiment, the some inorganic insulating layers that remain may include slits so that bending stresses can be dispersed.

A second pattern IST1*b* of the first sensing line IST1 may extend on the planarization layer FLT and be electrically connected with the first pad PDE1. In an embodiment, the second pattern IST1*b* may be formed using a same material as that of the first connection pattern CNP1 through a same process.

A first line protective layer LPL1 may cover the planarization layer FLT and the second pattern IST1*b*. Furthermore, a second line protective layer LPL2 may cover the first line protective layer LPL1. In an alternative embodiment, the configuration of the second line protective layer LPL2 may be omitted. The first and second line protective layers LPL1 and LPL2 may include or be formed of organic material. The first and second line protective layers LPL1 and LPL2 each may correspond to any one of the first via layer VIA1, the second via layer VIA2, and the pixel defining layer PDL. In an embodiment, for example, in an embodiment where the first line protective layer LPL1 is formed using a same material as that of the first via layer VIA1 through a same process, the second line protective layer LPL2 may be formed using a same material as that of the second via layer VIA2 or the pixel defining layer PDL through the same process. Alternatively, in an embodiment where the first line protective layer LPL1 is formed using a same material as that of the second via layer VIA2 through a same process, the second line protective layer LPL2 may be formed using a same material as that of the pixel defining layer PDL through a same process.

The first and second line protective layers LPL1 and LPL2 and the first sensing insulating layer ISM may include a first opening OPN1 which exposes the second pattern IST1*b*.

The first pattern IST1*a* may be connected with the second pattern IST1*b* through the first opening OPN1. In an embodiment, a height of a portion of the second pattern IST1*b* that is disposed on the first insulating layer group ING1 and one end of the planarization layer FLT may be greater than a height of a portion of the second pattern IST1*b* that is disposed on the planarization layer FLT corresponding to the first trench TCH1.

Therefore, the first pattern IST1*a* and the second pattern IST1*b* may be directly connected to each other without a separate bridge line. Since the bridge line is not provided, connection reliability between the first pattern IST1*a* and the second pattern IST1*b* may be enhanced. In addition, the length of the non-display area NDA may be reduced by the length of the bridge line, whereby dead space may be reduced, and a thin bezel may be easily embodied.

A third pattern IST1*c* of the first sensing line IST1 may connect the first pad PDE1 and the second pattern ISTb to each other. The third pattern IST1*c* may be formed using a same material as that of the gate electrode GE of the transistor through a same process. In an embodiment, the third pattern IST1*c* may be formed using a same material as that of the upper electrode UE through a same process. In an embodiment, odd numbered third patterns IST1*c* may be formed using a same material as that of the gate electrode GE of the transistor through a same process. Even numbered third patterns IST1*c* may be formed using a same material as that of the upper electrode UE through a same process. In contrast, the even numbered third patterns IST1*c* may be formed using a same material as that of the gate electrode GE of the transistor through a same process. The odd numbered third patterns IST1*c* may be formed using a same material as that of the upper electrode UE through a same process. Accordingly, a short-circuit problem between adjacent lines may be more efficiently prevented from occurring.

The second insulating layer group ING2 may include a second opening OPN2 that exposes the third pattern IST1*c*. Furthermore, the planarization layer FLT may include an opening corresponding to the second opening OPN2. The second pattern IST1*b* may be connected with the third pattern IST1*c* through the second opening OPN2.

Figure 16:
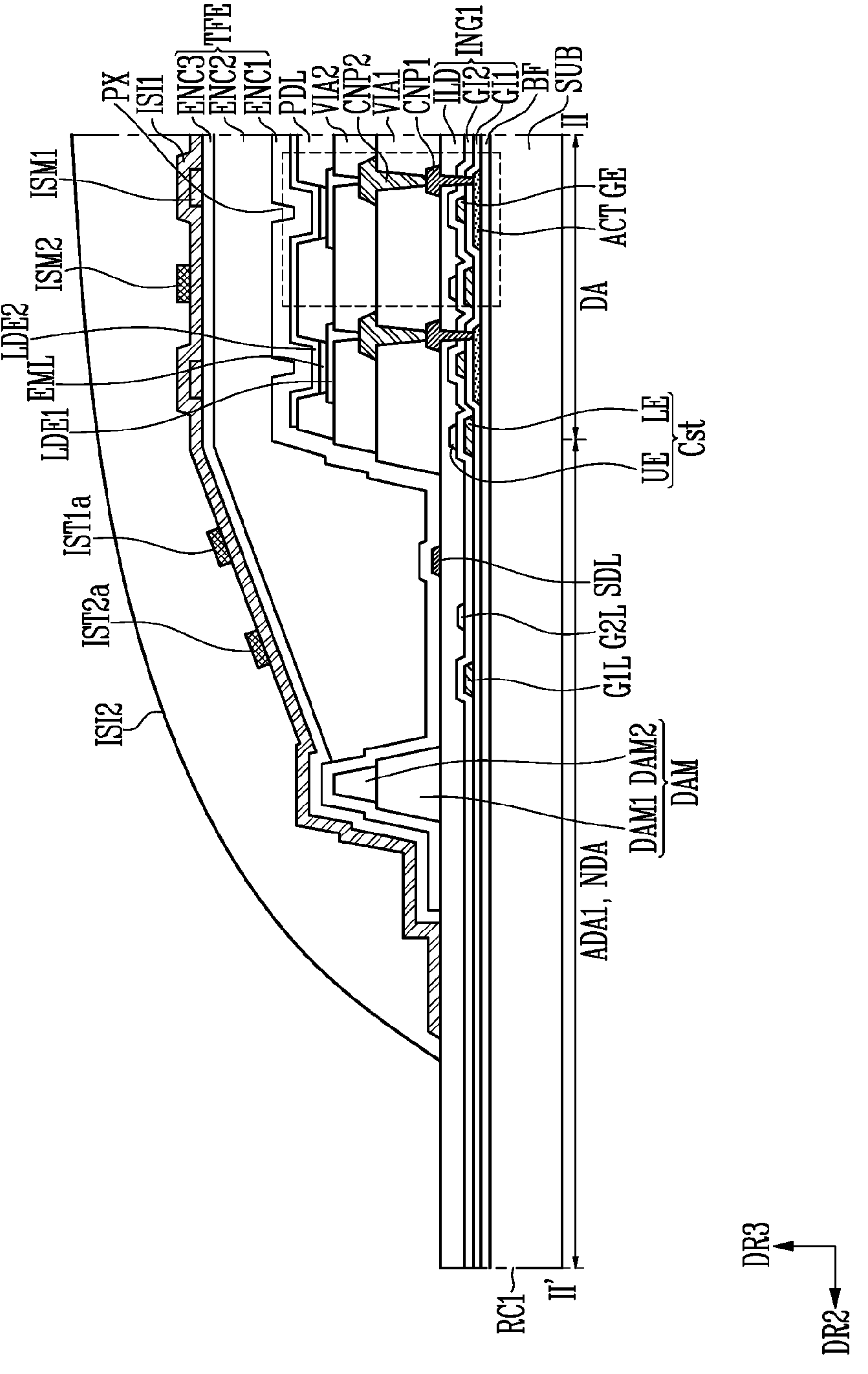

FIG. 16 is a cross-sectional view taken along line II-II' of FIG. 14 in accordance with an embodiment.

Line II-II' of FIG. 14 may correspond to the first bending axis BX1. The same or like elements shown in FIGS. 15 and 16 have been labeled with the same reference characters, and any repetitive detailed description thereof will be omitted. Here, the features of the portion adjacent to the first side edge RC1 may be substantially the same as those of the portion adjacent to the second side edge RC2.

The display lines DST may be formed of or defined by a single layer line or multilayer line, and include the lines G1L, G2L, and SDL. The line G1L may be formed using a same material as that of the gate electrode GE through a same process. The line G2L may be formed using a same material as that of the upper electrode UE through a same process. The line SDL may be formed using a same material as that of the first connection pattern CNP1 through a same process.

The patterns IST1*a* and IST2*a* of the sensing lines IST1 and IST2 may be disposed on the encapsulation layer TFE and the first sensing insulating layer ISM (based on the third direction DR3) and disposed between the dam DAM and the display area DA (based on the second direction DR2). The first sensing insulating layer ISI1 may be disposed between the encapsulation layer TFE and the sensing lines IST1 and IST2.

Figure 17:
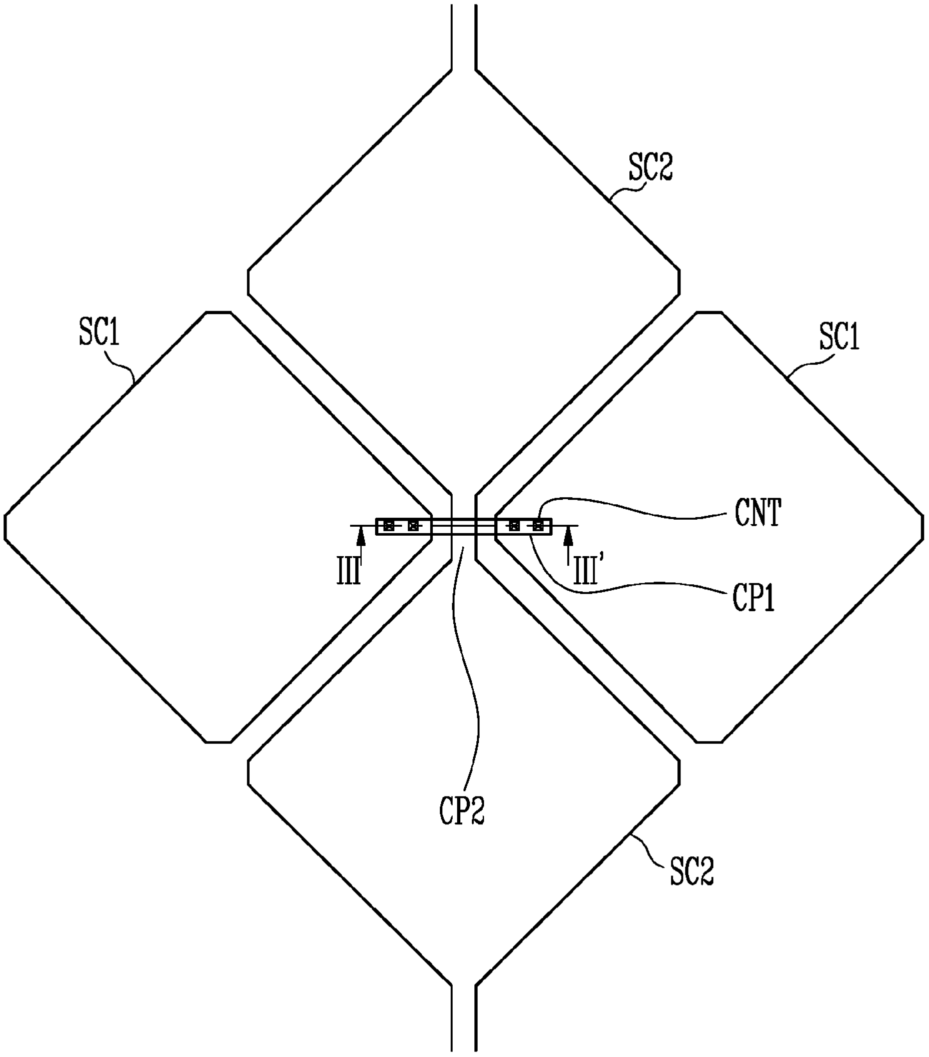
Figure 18:
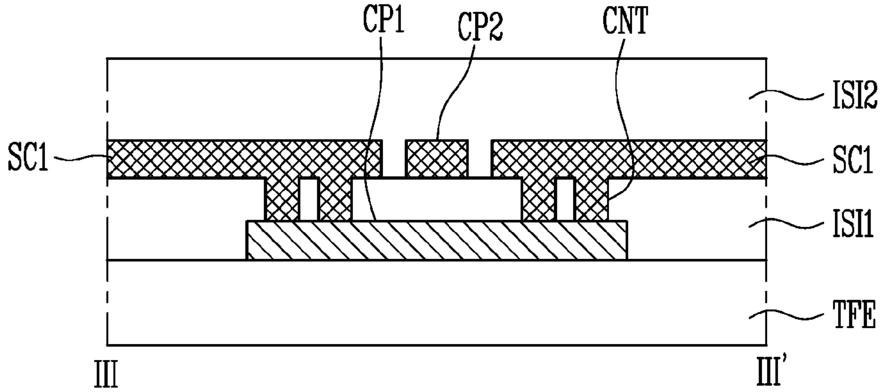

FIGS. 17 and 18 are diagrams for describing sensing electrodes and bridge electrodes in accordance with an embodiment of the disclosure. FIG. 18 is a cross-sectional view taken along line III-III' of FIG. 17.

The bridge electrodes CP1 may be disposed on the encapsulation layer TFE by patterning the first sensing electrode layer ISM1.

The first sensing insulating layer ISI1 may cover the bridge electrodes CP1, and include contact holes CNT that expose portions of the bridge electrodes CP1.

The first sensing electrodes SC1 and the second sensing electrodes SC2 may be formed on the first sensing insulating layer ISM by patterning the second sensing electrode layer ISM2. The first sensing electrodes SC1 may be connected to the bridge electrode CP1 through the contact holes CNT.

The second sensing electrodes SC2 may have a connection pattern CP2 formed in or directly on a same layer by patterning the second sensing electrode layer ISM2. Therefore, the second sensing electrodes SC2 may be connected to each other without using a separate bridge electrode.

In an embodiment, each of the sensing electrodes SC1 and SC2 may cover a plurality of pixels PX. Here, in an embodiment where the sensing electrodes SC1 and SC2 includes or are formed of an opaque conductive layer, each of the sensing electrodes SC1 and SC2 may include a plurality of openings that expose a plurality of pixels PX that are covered by the corresponding sensing electrode SC1, SC2. In an embodiment, for example, each of the sensing electrodes SC1 and SC2 may have a mesh shape. In an embodiment where each of the sensing electrodes SC1 and SC2 include or is formed of a transparent conductive layer, each sensing electrode SC1, SC2 may be provided in the form of a plate with no opening.

Figure 19:
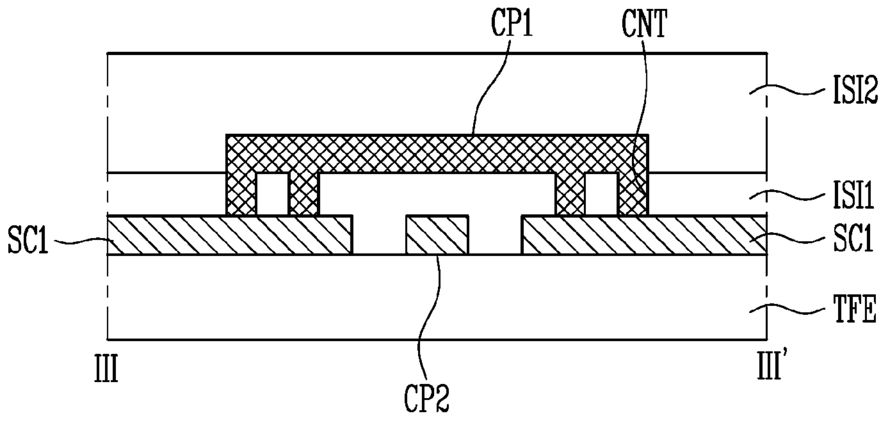

FIG. 19 is a diagram for describing sensing electrodes and bridge electrodes in accordance with an alternative embodiment of the disclosure.

FIG. 19 is a cross-sectional view taken along line III-III' of FIG. 17.

The first sensing electrodes SC1 and the second sensing electrodes SC2 may be formed by patterning the first sensing electrode layer ISM1, and may be disposed on the encapsulation layer TFE.

The first sensing insulating layer ISM may cover the first sensing electrodes SC1 and the second sensing electrodes SC2 and include contact holes CNT that expose portions of the first sensing electrodes SC1.

The bridge electrodes CP1 may be formed by patterning the second sensing electrode layer ISM2 and disposed on the first sensing insulating layer ISM. The bridge electrodes CP1 may be connected to the first sensing electrodes SC1 through the contact holes CNT.

In embodiments of the invention, as described herein, a display device may accurately sense exponential current rather than linear current.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a pixel including a light emitting element; and a sensing channel connected to a cathode electrode of the light emitting element by a first sensing line, and connected to an anode electrode of the light emitting element by a second sensing line, wherein the sensing channel comprises:

an amplifier including a first input terminal directly connected to the second sensing line; and a first switch which directly connects an output terminal of the amplifier to the first sensing line, wherein the display device further comprises a second switch which connects the cathode electrode of the light emitting element to a first power line, wherein the pixel comprises a first transistor including a gate electrode connected to a first node, a first electrode connected to a second power line, and a second electrode connected to a second node, wherein, during a first period of a threshold voltage sensing period of the first transistor, the first switch is in a turned-off state, and the second switch is in a turned-on state, and during a second period after the first period, the first switch is in a turned-on state, and the second switch is in a turned-off state.

2. The display device according to claim 1, wherein a turn-on period of the first switch and a turn-on period of the second switch do not overlap each other.

3. The display device according to claim 1, wherein the pixel further comprises:

a second transistor including a gate electrode connected to a first scan line, a first electrode connected to a data line, and a second electrode connected to the first node;

a third transistor including a gate electrode connected to a second scan line, a first electrode connected to an initialization line, and a second electrode connected to the second node; and a storage capacitor including a first electrode connected to the first node, and a second electrode connected to the second node.

4. The display device according to claim 3, wherein the first input terminal of the amplifier receives an input voltage independent from an initialization voltage of the initialization line.

5. The display device according to claim 4, wherein a second input terminal of the amplifier is connected to a ground.

6. The display device according to claim 5, wherein the first input terminal of the amplifier is an inverting terminal, and the second input terminal of the amplifier is a non-inverting terminal.

7. The display device according to claim 3, wherein, during a display period, the first switch is in a turned-off state, and the second switch is in a turned-on state.

8. The display device according to claim 3, wherein, during a diode voltage sensing period for the light emitting element, the first switch is in a turned-on state, and the second switch is in a turned-off state.

9. The display device according to claim 3, wherein, during a mobility sensing period of the first transistor, the first switch is in a turned-on state, and the second switch is in a turned-off state.

10. A display device comprising:

a pixel including a light emitting element; and a sensing channel connected to a cathode electrode of the light emitting element by a first sensing line, and connected to at least one transistor of the pixel by a second sensing line, wherein the sensing channel comprises:

an amplifier including a first input terminal directly connected to the second sensing line; and a first switch which directly connects an output terminal of the amplifier to the first sensing line; and wherein the display device further comprises a second switch which connects the cathode electrode of the light emitting element to a first power line, wherein the pixel comprises a first transistor including a gate electrode connected to a first node, a first electrode connected to a second power line, and a second electrode connected to a second node, wherein, during a first period of a threshold voltage sensing period of the first transistor, the first switch is in a turned-off state, and the second switch is in a turned-on state, and during a second period after the first period, the first switch is in a turned-on state, and the second switch is in a turned-off state.

11. The display device according to claim 10, wherein a turn-on period of the first switch and a turn-on period of the second switch do not overlap each other.

12. The display device according to claim 10, wherein the pixel further comprises:

a second transistor including a gate electrode connected to a first scan line, a first electrode connected to a data line, and a second electrode connected to the first node;

a third transistor including a gate electrode connected to a second scan line, a first electrode connected to an initialization line, and a second electrode connected to the second node; and a storage capacitor including a first electrode connected to the first node, and a second electrode connected to the second node.

13. The display device according to claim 12, wherein the at least one transistor comprises the third transistor.

14. The display device according to claim 12, wherein the first input terminal of the amplifier is connected to the initialization line.

15. The display device according to claim 14, wherein a second input terminal of the amplifier is connected to a ground.

16. The display device according to claim 15, wherein the first input terminal of the amplifier is an inverting terminal, and the second input terminal of the amplifier is a non-inverting terminal.

17. The display device according to claim 10, wherein, during a display period, the first switch is in a turned-off state, and the second switch is in a turned-on state.

* * * * *